United States Patent
Kwon et al.

(10) Patent No.: US 10,268,302 B2
(45) Date of Patent: Apr. 23, 2019

(54) METHOD AND APPARATUS FOR RECOGNIZING GRIP STATE IN ELECTRONIC DEVICE

(71) Applicant: Samsung Electronics Co., Ltd., Gyeonggi-do (KR)

(72) Inventors: Jung-Tae Kwon, Gyeonggi-do (KR); Dong-Sub Kim, Gyeonggi-do (KR); Byeong-Jae Kim, Gyeonggi-do (KR); Chang-Jin Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 175 days.

(21) Appl. No.: 14/911,850

(22) PCT Filed: Aug. 13, 2014

(86) PCT No.: PCT/KR2014/007549
§ 371 (c)(1),
(2) Date: Feb. 12, 2016

(87) PCT Pub. No.: WO2015/023136
PCT Pub. Date: Feb. 19, 2015

(65) Prior Publication Data
US 2016/0195986 A1    Jul. 7, 2016

(30) Foreign Application Priority Data
Aug. 13, 2013 (KR) .................. 10-2013-0096107

(51) Int. Cl.
*G06F 3/041* (2006.01)
*G06F 3/044* (2006.01)
(Continued)

(52) U.S. Cl.
CPC .......... *G06F 3/0416* (2013.01); *G06F 1/1643* (2013.01); *G06F 3/044* (2013.01);
(Continued)

(58) Field of Classification Search
CPC ...... G06F 3/0416; G06F 3/165; G06F 3/0488; G06F 3/044; G06F 3/0418; G06F 3/048;
(Continued)

(56) References Cited

U.S. PATENT DOCUMENTS 8,941,591 B2 *  1/2015  Gear ................ G06F 1/1626
                                                    345/158
9,541,993 B2 *  1/2017  Balasundaram ...... G06F 3/0488
(Continued)

FOREIGN PATENT DOCUMENTS

CN      101573673 A      11/2009
CN      102169401 A       8/2011
(Continued)

OTHER PUBLICATIONS

European Search Report dated Jun. 12, 2017.
(Continued)

*Primary Examiner* — Darlene M Ritchie
(74) *Attorney, Agent, or Firm* — Cha & Reiter, LLC.

(57) ABSTRACT

A method and apparatus for recognizing a user's grip state using a Touch Screen Panel (TSP) sensor in an electronic device are provided. The method for recognizing the user's grip state in the electronic device includes the processes of detecting a hovering input generated by a user's grip through a self-capacitive or mutual-capacitive touch screen, and determining the user's grip state in accordance with the detected hovering input.

14 Claims, 43 Drawing Sheets

(51) Int. Cl.
*G06F 3/048* (2013.01)
*G06F 3/16* (2006.01)
*H04M 1/23* (2006.01)
*G06F 1/16* (2006.01)
*G06N 99/00* (2010.01)
*G06F 3/0488* (2013.01)

(52) U.S. Cl.
CPC ............ *G06F 3/0488* (2013.01); *G06F 3/165* (2013.01); *H04M 1/236* (2013.01); *G06F 2203/04108* (2013.01); *G06N 99/005* (2013.01)

(58) Field of Classification Search
CPC ......... G06F 1/1643; G06F 2203/04108; G06F 2203/04104; H04M 1/236; G06N 99/005
See application file for complete search history.

(56) References Cited

U.S. PATENT DOCUMENTS

| | | | |
|---|---|---|---|
| 2006/0097991 | A1 | 5/2006 | Hotelling et al. |
| 2006/0197750 | A1 | 9/2006 | Kerr et al. |
| 2007/0002016 | A1 | 1/2007 | Cho et al. |
| 2007/0103454 | A1 | 5/2007 | Elias |
| 2008/0158145 | A1 | 7/2008 | Westerman |
| 2008/0168403 | A1 | 7/2008 | Westerman et al. |
| 2009/0002016 | A1 | 1/2009 | Hutchings et al. |
| 2010/0134423 | A1* | 6/2010 | Brisebois ............ G06F 3/03547 345/173 |
| 2010/0177121 | A1 | 7/2010 | Homma et al. |
| 2011/0007021 | A1 | 1/2011 | Bernstein et al. |
| 2011/0109577 | A1 | 5/2011 | Lee et al. |
| 2011/0128164 | A1 | 6/2011 | Kang et al. |
| 2011/0161888 | A1 | 6/2011 | Ito et al. |
| 2011/0248918 | A1 | 10/2011 | Yoo et al. |
| 2011/0250928 | A1* | 10/2011 | Schlub .................. H01Q 1/243 455/550.1 |
| 2011/0316790 | A1 | 12/2011 | Ollila et al. |
| 2012/0064948 | A1 | 3/2012 | Lee et al. |
| 2012/0082329 | A1* | 4/2012 | Neumeyer ............. H04R 25/50 381/314 |
| 2012/0188183 | A1 | 7/2012 | Heo et al. |
| 2012/0262398 | A1 | 10/2012 | Kim et al. |
| 2012/0274589 | A1 | 11/2012 | De Angelo |
| 2013/0324056 | A1* | 12/2013 | Maguire ................ H01Q 1/245 455/73 |
| 2014/0062951 | A1* | 3/2014 | Chang .................... G06F 3/044 345/174 |
| 2014/0099992 | A1* | 4/2014 | Burns .................... G06F 3/044 455/550.1 |
| 2014/0232691 | A1 | 8/2014 | Lee |
| 2014/0320420 | A1* | 10/2014 | Ida .......................... G06F 3/044 345/173 |
| 2014/0335836 | A1* | 11/2014 | Zhang .................... G06F 3/165 455/414.1 |
| 2014/0362023 | A1* | 12/2014 | Fujii ..................... G06F 1/1652 345/174 |
| 2015/0029152 | A1 | 1/2015 | Westerman et al. |
| 2015/0062054 | A1* | 3/2015 | Yun ........................ G06F 3/044 345/174 |
| 2015/0301647 | A1* | 10/2015 | Sato ....................... G06F 3/044 345/174 |
| 2016/0364138 | A1* | 12/2016 | Luo ..................... G06F 3/04886 |

FOREIGN PATENT DOCUMENTS

| | | |
|---|---|---|
| JP | 2010-140321 A | 6/2010 |
| JP | 2012-108674 A | 6/2012 |
| JP | 2012-234387 A | 11/2012 |
| KR | 10-0595922 B1 | 7/2006 |
| KR | 10-2010-0121183 A | 11/2010 |
| KR | 10-2010-0133259 A | 12/2010 |
| KR | 10-2011-0052270 A | 5/2011 |
| KR | 10-2011-0112606 A | 10/2011 |
| KR | 10-2011-0134810 A | 12/2011 |
| KR | 10-1092722 B1 | 12/2011 |
| KR | 10-2012-0001941 A | 1/2012 |
| KR | 10-1109241 B1 | 1/2012 |
| KR | 10-2012-0085392 A | 8/2012 |
| KR | 10-2012-0117219 A | 10/2012 |
| KR | 10-2012-0123487 A | 11/2012 |
| KR | 10-2013-0035243 A | 4/2013 |
| KR | 10-2013-0038613 A | 4/2013 |
| KR | 10-2013-0052116 A | 5/2013 |
| WO | 2005/114369 A2 | 12/2005 |
| WO | 2006/020305 A2 | 2/2006 |
| WO | 2011/098496 A1 | 8/2011 |
| WO | 2013/101220 A1 | 7/2013 |

OTHER PUBLICATIONS

Australian Search Report dated Jul. 13, 2017.
Australian Search Report dated Jan. 27, 2017.
European Search Report dated Mar. 1, 2017.
Australian Search Report dated Oct. 11, 2017.
Chinese Search Report dated Nov. 3, 2017.
European Search Report dated Oct. 8, 2018.

* cited by examiner

METHOD AND APPARATUS FOR RECOGNIZING GRIP STATE IN ELECTRONIC DEVICE

CLAIM OF PRIORITY

This application is a National Phase Entry of PCT International Application No. PCT/KR2014/007549, which was filed on Aug. 13, 2014, and claims a priority to Korean Patent Application No. 10-2013-0096107, which was filed on Aug. 13, 2013, the contents of which are incorporated herein by reference.

BACKGROUND OF THE INVENTION

1. Field of the Invention

The present invention generally relates to an electronic device and, more particularly, relates to a method and apparatus for recognizing a user's grip state using a Touch Screen Panel (TSP) sensor in the electronic device.

2. Description of the Related Art

Rather than self functions of portable terminals, accessibilities enabling users to use conveniently the portable terminals are emerging as significant issues. For example, the portable terminal installs an acceleration sensor or a gyro sensor, etc. and displays a screen in accordance with a user's grip position for the portable terminal, thereby increasing a user convenience.

Also, to enhance the user convenience, a user-oriented user interface is being developed in which, even when not gripping the portable terminal with both hands, the user can handle the portable terminal with one hand. To provide these various user interfaces, the portable terminal installs an additional grip sensor in a side or rear part of the portable terminal and determines a user's grip state using an input value of the corresponding grip sensor.

As above, the conventional art requires a separate additional grip sensor for determining the user's grip state. This can incur an additional cost for the production of products.

SUMMARY OF THE INVENTION

An object of the present invention is to provide a method and apparatus for recognizing a user's grip state using a Touch Screen Panel (TSP) sensor in an electronic device.

Another object of the present invention is to provide a method and apparatus for determining sensors determining grip or non-grip at hovering input, analyzing a distribution or pattern of output signals of the determined sensors, and recognizing a user's grip state in an electronic device.

A further object of the present invention is to provide a method and apparatus for recognizing a user's grip state without using a separate grip sensor for the sake of cost reduction.

According to various exemplary embodiments of the present invention for achieving the above objects, there is provided a method for recognizing a user's grip state in an electronic device. The method may include the processes of detecting a hovering input generated by a user's grip through a self-capacitive or mutual-capacitive touch screen, and determining the user's grip state in accordance with the detected hovering input.

According to various exemplary embodiments of the present invention, the process of determining the user's grip state may include the processes of analyzing an output signal corresponding to the hovering input based on a reference value detected in a non-grip state, and determining the user's grip state based on a one-dimension or two-dimension distribution of the output signal whose difference with the reference value is equal to or is greater than a threshold.

According to various exemplary embodiments of the present invention, the process of determining the user's grip state may include the processes of determining that it is a right-hand grip state if the output signal whose difference with the reference value is equal to or is greater than the threshold is generated at the right edge of a corresponding axis, determining that it is a left-hand grip state if the output signal whose difference with the reference value is equal to or is greater than the threshold is generated at the left edge of the corresponding axis, and determining that it is a both-hand grip state if the output signals whose differences with the reference value are equal to or are greater than the threshold are generated at the right edge and left edge of the corresponding axis.

According to various exemplary embodiments of the present invention, the process of determining the user's grip state based on the one-dimension distribution may include the process of determining that it is a left-hand grip state if a strength of the output signal whose difference with the reference value is equal to or is greater than the threshold is of a form of decreasing-increasing-decreasing in the direction of a corresponding axis, and determining that it is a right-hand grip state if it is of a form of increasing-decreasing-increasing in the direction of the corresponding axis, and determining that it is a both-hand grip state if it is of a form of decreasing-increasing-decreasing-increasing-decreasing-increasing in the direction of the corresponding axis.

According to various exemplary embodiments of the present invention, the process of determining the user's grip state based on the two-dimension distribution may include the process of determining that it is a right-hand grip state if the output signal whose difference with the reference value is equal to or is greater than the threshold is generated in a specific shape and magnitude at the right and lower end of a plane corresponding to the touch screen, determining that it is a left-hand grip state if the output signal whose difference with the reference value is equal to or is greater than the threshold is generated in a specific shape and magnitude at the left and lower end of the plane, and determining that it is a both-hand grip state if the output signals whose differences with the reference value are equal to or are greater than the threshold are generated in specific shapes and magnitudes at the left and lower end and right and lower end of the plane.

According to various exemplary embodiments of the present invention for achieving the objects, there is provided an apparatus for recognizing a user's grip state in an electronic device. The apparatus may include a self-capacitive or mutual-capacitive touch screen, and a touch screen controller controlling the touch screen. The touch screen controller may detect a hovering input generated by a user's grip through the touch screen, and determine the user's grip state in accordance with the detected hovering input.

According to various exemplary embodiments of the present invention, the touch screen controller may analyze an output signal corresponding to the hovering input based on a reference value detected in a non-grip state, and determine the user's grip state based on a one-dimension or two-dimension distribution of the output signal whose difference with the reference value is equal to or is greater than a threshold.

According to various exemplary embodiments of the present invention, the touch screen controller may determine that it is a right-hand grip state if the output signal whose difference with the reference value is equal to or is greater than the threshold is generated at the right edge of a corresponding axis, determine that it is a left-hand grip state if the output signal whose difference with the reference value is equal to or is greater than the threshold is generated at the left edge of the corresponding axis, and determine that it is a both-hand grip state if the output signals whose differences with the reference value are equal to or are greater than the threshold are generated at the right edge and left edge of the corresponding axis.

According to various exemplary embodiments of the present invention, the touch screen controller may determine that it is a left-hand grip state if a strength of the output signal whose difference with the reference value is equal to or is greater than the threshold is of a form of decreasing-increasing-decreasing in the direction of a corresponding axis, determine that it is a right-hand grip state if it is of a form of increasing-decreasing-increasing in the direction of the corresponding axis, and determine that it is a both-hand grip state if it is of a form of decreasing-increasing-decreasing-increasing-decreasing-increasing in the direction of the corresponding axis.

According to various exemplary embodiments of the present invention, the touch screen controller may determine that it is a right-hand grip state if the output signal whose difference with the reference value is equal to or is greater than the threshold is generated in a specific shape and magnitude at the right and lower end of a plane corresponding to the touch screen, determine that it is a left-hand grip state if the output signal whose difference with the reference value is equal to or is greater than the threshold is generated in a specific shape and magnitude at the left and lower end of the plane, and determine that it is a both-hand grip state if the output signals whose differences with the reference value are equal to or are greater than the threshold are generated in specific shapes and magnitudes at the left and lower end and right and lower end of the plane.

According to various exemplary embodiments of the present invention, the touch screen controller may determine using a method of mechanical learning based on a pattern of previously extracted data.

According to various exemplary embodiments of the present invention for achieving the objects, there is provided a method for data transmission/reception in an electronic device. The method may include the processes of detecting a hovering input through a touch screen, determining a distribution of an output signal corresponding to the hovering input based on a self-capacitive scheme or a mutual-capacitive scheme, determining a user's grip position in accordance with a form of distribution of the output signal, selecting at least one antenna in consideration of the user's grip position, and transmitting/receiving data using the selected at least one antenna.

According to various exemplary embodiments of the present invention, the process of selecting the at least one antenna in consideration of the user's grip position may include the process of selecting the remnant antenna excepting an antenna corresponding to the user's grip position.

According to various exemplary embodiments of the present invention for achieving the objects, there is provided a method for adjusting a call volume in an electronic device. The method may include the processes of detecting a hovering input through a touch screen, determining a distribution of an output signal corresponding to the hovering input based on a self-capacitive scheme or mutual-capacitive scheme, determining a user's grip state in accordance with a form of distribution of the output signal, and adjusting the call volume in accordance with the user's grip state.

According to various exemplary embodiments of the present invention, the process of adjusting the call volume in accordance with the user's grip state may include the process of, if the user's grip state is a left-hand grip state, adjusting the call volume in consideration of the left hearing of a user, and if the user's grip state is a right-hand grip state, adjusting the call volume in consideration of the right hearing of the user.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In describing the present invention, well-known functions or constructions are not described in detail since they would obscure the invention in unnecessary detail. And, terms described below, which are defined considering functions in the present invention, can be modified in accordance to user and operator's intention or practice. Therefore, the definition should be given on the basis of the content throughout the present specification.

Below, various exemplary embodiments of the present invention describe a method and apparatus for recognizing a user's grip state using a Touch Screen Panel (TSP) sensor in an electronic device.

Figure 1:
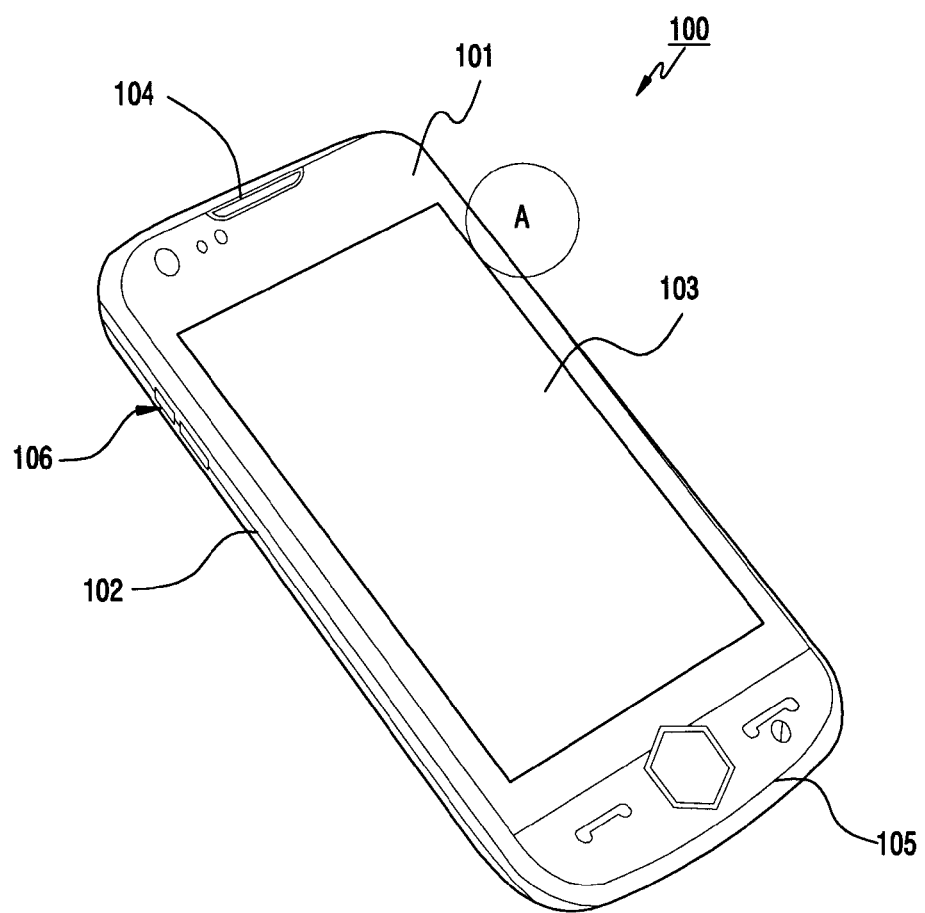
FIG. 1 is a perspective diagram illustrating an electronic device using a touch screen as an input and output means according to various exemplary embodiments of the present invention.

FIG. 1 is a perspective diagram illustrating an electronic device using a touch screen as an input and output means according to various exemplary embodiments of the present invention.

Referring to FIG. 1, a volume up/down key button 106 may be installed in a side surface 102 of the electronic device 100, and a power on/off key button may be installed in a portion 'A' of the right side of the electronic device 100. Also, the power on/off key button may be used as a key button for converting a sleep mode of the electronic device 100 into an active mode. The volume up/down key button 106 and the power on/off key button may be installed in, though not limited to, any position of left and right side surfaces and up and down side surfaces of the electronic device 100.

Further, a display 103 performing data input and output together may be installed in a front surface 101 of the electronic device 100. A speaker 104 may be installed in an upper part of the display 103. A microphone 105 may be installed in a lower side of the display 103.

The display 103 provides an input/output interface between the electronic device 100 and a user. Particularly, in various exemplary embodiments of the present invention, the display 103 may include a touch panel of a capacitive scheme. The capacitive scheme is a scheme arranging a pole plate on a substrate and applying a voltage to the pole plate. The capacitive scheme works in the principle of, when the hand gets in touch with the pole plate, detecting a parasitic capacitance dependent on a dielectric constant between the hand and the pole plate and determining its position coordinate.

In the conventional art, separate grip sensors may be installed in the left and right side surfaces of the electronic device 100. When the electronic device 100 is gripped with the user's hand, the grip sensors of the left and right side surfaces corresponding to a gripped zone of the electronic device 100 may output signals, whereby the electronic device 100 may recognize a user's grip state. For instance, when the electronic device 100 is gripped with the user's left hand, the palm may get in touch with the left side surface 102 of the electronic device 100 and the fingers may discontinuously get in touch with the right side surface of the electronic device 100. In contrast, when the electronic device 100 is gripped with the user's right hand, the palm may get in touch with the right side surface of the electronic device 100 and the fingers may discontinuously get in touch with the left side surface 102 of the electronic device 100.

Various exemplary embodiments of the present invention propose a technology capable of recognizing a user's grip state using a capacitive touch panel without using a separate grip sensor.

Figure 2:
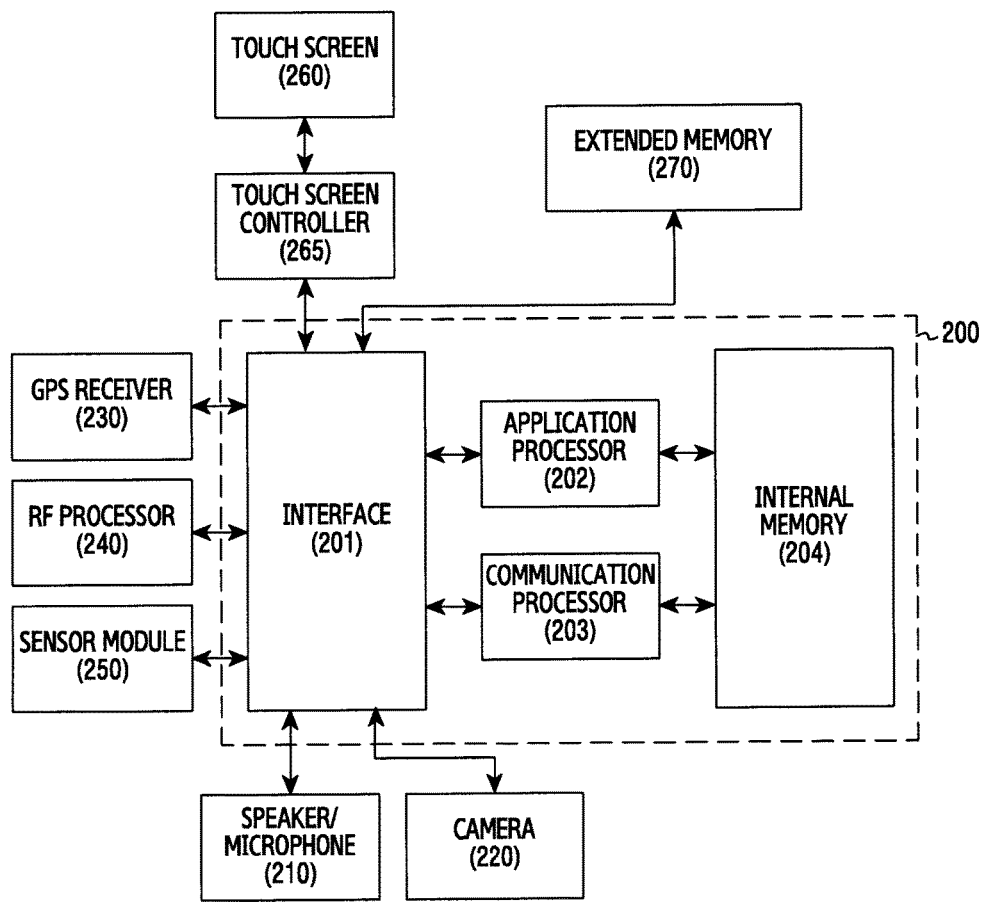
FIG. 2 is a diagram illustrating a construction of an electronic device according to various exemplary embodiments of the present invention.

FIG. 2 is a diagram illustrating a construction of an electronic device according to an exemplary embodiment of the present invention.

The electronic device 100 may be a device such as a portable terminal, a mobile terminal, a mobile pad, a media player, a tablet computer, a handheld computer, or a Personal Digital Assistant (PDA), a server, a personal computer, etc. Also, the electronic device 100 may be any electronic device including a device combining two or more functions among these devices.

Referring to FIG. 2, the electronic device 100 includes a controller 200, a speaker/microphone 210, a camera 220, a Global Positioning System (GPS) receiver 230, a Radio Frequency (RF) processor 240, a sensor module 250, a touch screen 260, a touch screen controller 265, and an extended memory 270.

The controller 200 may include an interface 201, one or more processors 202 and 203, and an internal memory 204. According to cases, the entire controller 200 is called a processor. The interface 201, the application processor 202, the communication processor 203, and the internal memory 204 may be separate constituent elements or may be integrated in one or more integrated circuits.

Figure 10A:
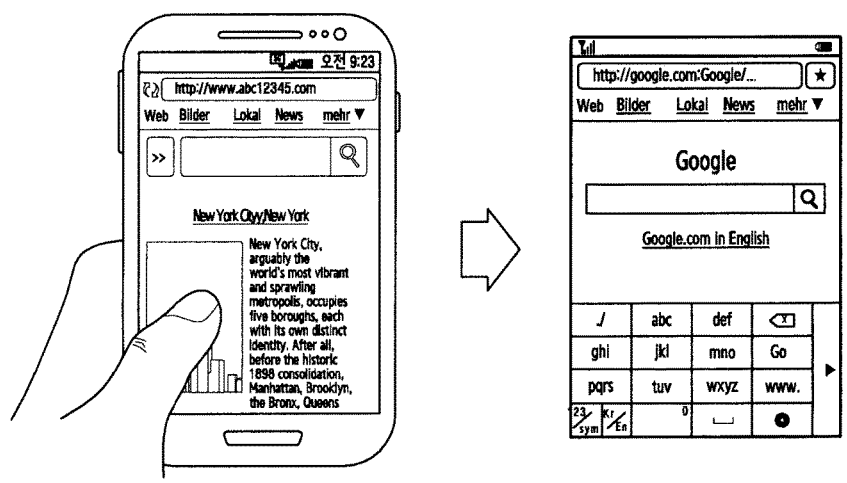
FIGS. 10A to 10C illustrate examples of displaying a soft keyboard array dependent on a user's grip state according to various exemplary embodiments of the present invention.
Figure 10B:
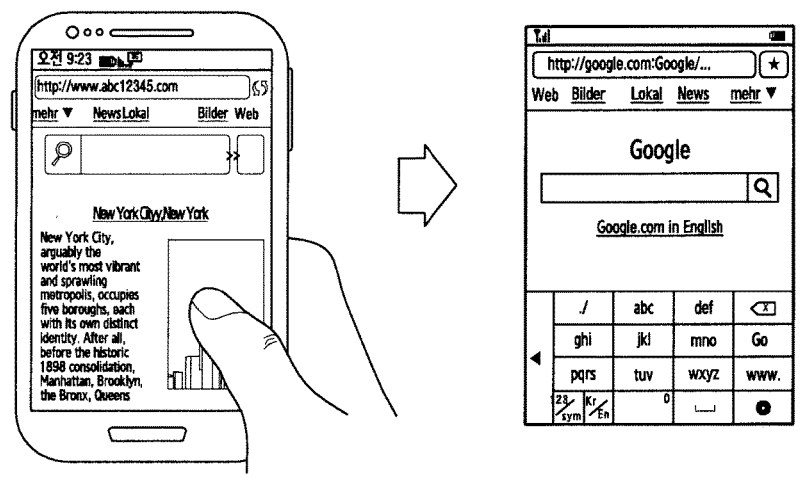
Figure 10C:
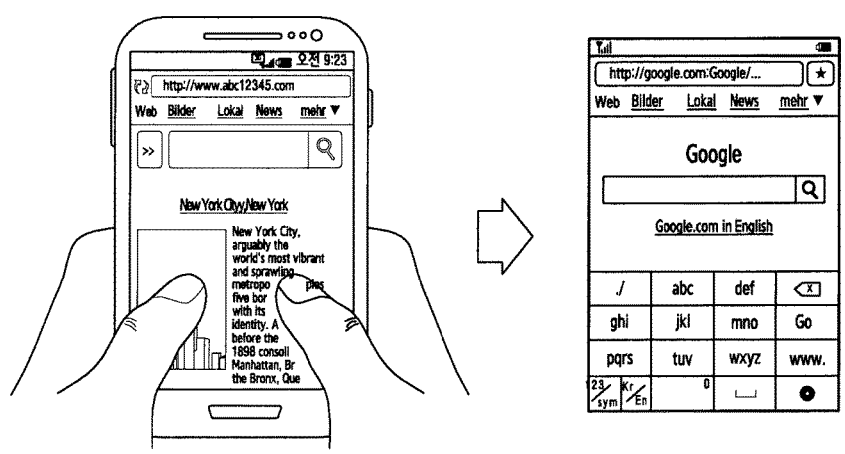
Figure 12A:
FIGS. 12A and 12B illustrate examples of volume adjustment dependent on a user's grip state according to various exemplary embodiments of the present invention.
Figure 12B:
Figure 15A:
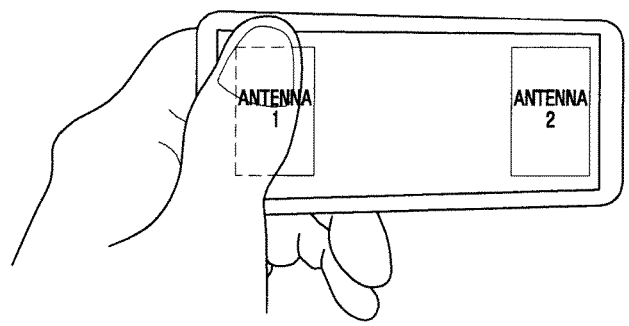
FIGS. 15A and 15B illustrate examples of antenna selection dependent on user's grip positions according to various exemplary embodiments of the present invention.
Figure 15B:
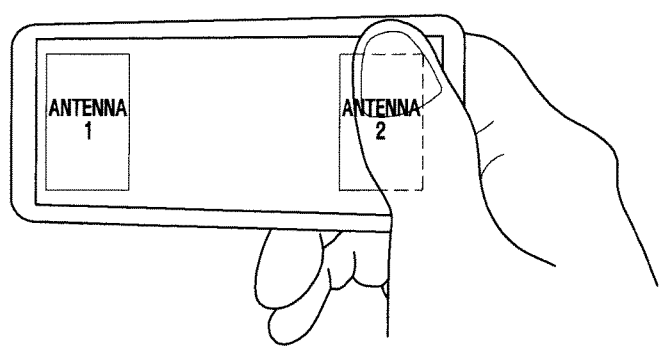

The application processor 202 may execute several software programs and perform several functions of the electronic device 100. The communication processor 203 may perform processing and control for voice communication and data communication. Further to this general function, the processors 202 and 203 also play a role of executing a specific software module (i.e., instruction set) stored in the extended memory 270 or internal memory 204 and performing specific several functions corresponding to the module. That is, the processors 202 and 203 may interlock software modules stored in the extended memory 270 or internal memory 204 and control a User eXperience (UX) or User Interface (UI) in accordance with a result of recognizing a user's grip state using a TSP sensor according to various exemplary embodiments of the present invention. As one example, the processors 202 and 203 may control to vary a user input keyboard in accordance with a user grip situation as illustrated in FIGS. 10A to 10C below. In various exemplary embodiments, the processors 202 and 203 may control to adjust a call volume dependent on a user's grip state as illustrated in FIGS. 12A and 12B. In various exemplary embodiments, the processors 202 and 203 may select an antenna in accordance with a user's grip position and control data transmission/reception as illustrated in FIGS. 15A and 15B.

The interface 201 may be connected to the touch screen controller 265 of the electronic device 100 and the extended memory 270 thereof. The sensor module 250 may be coupled to the interface 201 and perform many functions. For example, a motion sensor and an optical sensor may be coupled to the interface 201, and sense a motion of the electronic device 100 and sense the external light, respectively. Besides this, other sensors such as a position measuring system, a temperature sensor, or a bio-physical sensor, etc. may be connected to the interface 250 and perform related functions.

The camera 220 may be coupled with the sensor module 250 through the interface 201 and perform a camera function such as photo and video clip recording.

The RF processor 240 may perform a communication function. For example, in accordance with the control of the communication processor 203, the RF processor 240 may convert an RF signal into a baseband signal and provide the baseband signal to the communication processor 203 or may convert a baseband signal from the communication processor 203 into an RF signal and transmit the RF signal. Here, the communication processor 203 may process the baseband signal in various communication schemes. For example, the communication scheme may include, though not limited to, a Global System for Mobile Communication (GSM) communication scheme, an Enhanced Data GSM Environment (EDGE) communication scheme, a Code Division Multiple Access (CDMA) communication scheme, a Wideband-CDMA (W-CDMA) communication scheme, a Long Term Evolution (LTE) communication scheme, an Orthogonal Frequency Division Multiple Access (OFDMA) communication scheme, a Wireless Fidelity (Wi-Fi) communication scheme, a Worldwide Interoperability for Microwave Access (WiMAX) communication scheme or/and a Bluetooth communication scheme.

The speaker/microphone 210 may take charge of audio stream input and output such as voice recognition, voice replication, digital recording and telephone function. That is, the speaker/microphone 210 may convert a voice signal into an electric signal or convert an electric signal into a voice signal. Though not illustrated, attachable and detachable earphone, headphone or headset may be connected to the electronic device 100 through an external port.

The touch screen controller 265 may be coupled to the touch screen 260. The touch screen 260 and the touch screen controller 265 may detect a touch and motion or an interruption thereof using, though not limited to, not only capacitive, resistive, infrared and surface acoustic wave technologies for determining one or more touch points with the touch screen 260 but also arbitrary multi-touch sensing technologies including other proximity sensor arrays or other elements.

The touch screen 260 may provide an input/output interface between the electronic device 100 and a user. The touch screen 260 may include a display panel and a touch panel. The touch screen 260 may have a structure in which the touch panel is arranged in front of the display panel.

In various exemplary embodiments of the present invention, to determine a user's grip state, the touch screen 260 may use a touch panel of a capacitive scheme. The capacitive scheme may be implemented by a glass constructing the touch panel and a special transparent conductive metal material (e.g., Tin Antimony Oxide (TAO)) coated on both surfaces of the glass. The capacitive scheme may use a capacitance of the human body. A touch surface of the touch panel may be a glass coated with a thin conductive metal material, and form a flow of an electric current of a constant amount in a glass surface. If a user touches the coated glass surface, the electric current of the constant amount may be absorbed into the user's body out of the glass surface, and the touch screen may recognize a portion in which an amount of the electric current is changed, and check a touched portion of the touch screen.

For instance, the touch panel of the touch screen 260 may include a capacitive sensor sensing a user's touch. The capacitive touch screen 260 may be driven in a scheme of determining a touch input using a self capacitance generated between a touch object and a sensing electrode, and a scheme of applying a certain driving signal and determining a touch input using a mutual capacitance generated among a plurality of sensing electrodes by a touch object.

The self-capacitance scheme is a scheme of, though having an X and Y grid form, independently operating columns and rows and, by using one electrode every basic pixel for touch recognition, detecting a change of a capacitance of the electrode. The mutual-capacitance scheme, which is a scheme of using a capacitance between two electrodes, is a scheme of arranging one electrode at a horizontal axis and arranging the other electrode at a vertical axis and forming a matrix structure and then, sequentially measuring a capacitance formed at an intersection between the both axes, thereby sensing a change of a capacitance of a specific point.

On the other hand, the touch screen 260 may sense a user's proximity touch before a touch to the touch panel in accordance with a sensitivity of a capacitive sensor. Below, it is called hovering. For instance, if the sensitivity is high, the touch screen 260 may recognize the proximity touch though a distance between the touch panel and an input object (for instance, the user finger or a stylus pen, etc.) is far. In contrast, if the sensitivity is low, the touch screen 260 may not recognize the proximity touch until the distance between the touch panel and the input object (for instance, the user finger or the stylus pen, etc.) is close.

Further, to determine a user's grip state, the touch screen 260 may sense a hovering input and provide a self-capacitance output signal or mutual-capacitance output signal corresponding to the hovering input to the touch screen controller 265. At this time, the output signal from the touch screen 260 to the touch screen controller 265 may be outputted as sensor data in a 2D image form (referring to FIG. 7A to 7C below) or a 1D image form (referring to FIGS. 6A to 6K below).

The touch screen 260 forwards a user's touch input to the electronic device 100. Also, the touch screen 260 is a medium for showing an output of the electronic device 100 to a user. That is, the touch screen 260 shows a visual output to the user. The visual output may be shown in a form of a text, a graphic, a video, and a combination of them.

The touch screen 260 may use several displays. For example, the touch screen 260 may use, though not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The touch screen controller 265 may analyze a distribution or pattern of an output signal of a self-capacitive scheme or an output signal of a mutual-capacitive scheme corresponding to a touch input or hovering input sensed by the touch screen 260, and determine a user's grip state. Its detailed description is referred to FIG. 3 below.

The GPS receiver 230 may convert a signal received from an artificial satellite into information such as a position, a speed, time, etc. For example, a distance between the satellite and the GPS receiver 230 may be determined by a multiplication of the speed of light and a signal reaching time. Accurate positions and distances of three satellites may be obtained and a position of the electronic device 100 may be measured in the well-known triangulation principle.

The extended memory 270 or internal memory 204 may include a high-speed random access memory and/or nonvolatile memory such as one or more magnetic disk storage devices, one or more optical storage devices, and/or flash memories (for instance, NAND, NOR).

The extended memory 270 or internal memory 204 may store software. A software constituent element may include an Operating System (OS) software module, a communication software module, a graphic software module, a user interface software module, an MPEG module, a camera software module, one or more application software modules, etc. Also, since the module, a software constituent element, may be expressed as a set of instructions, the module may be expressed as an instruction set as well. The module may be also expressed as a program.

The operating system software module may include various software constituent elements controlling general system operation. Control of this general system operation may represent, for example, memory management and control, storage hardware (device) control and management, power control and management, etc. The operating system software module may perform even a function of making smooth communication between several hardware (devices) and software constituent elements (modules).

The communication software module may enable the electronic device 100 to communicate with other electronic devices such as a computer, a server and/or a portable terminal, etc. through the RF processor 240. And, the communication software module may be configured to have a protocol structure corresponding to a corresponding communication scheme.

The graphic software module may include several software constituent elements for providing and displaying a graphic on the touch screen 260. The term 'graphic' may be used as a meaning including a text, a web page, an icon, a digital image, a video, an animation, etc.

The user interface software module may include several software constituent elements related to a user interface. The user interface software module may include content about how a state of the user interface is changed or a change of the state of the user interface is performed in which condition.

The camera software module may include a camera related software constituent element for enabling camera related processes and functions. The application module may include a web browser including a rendering engine, an electronic mail (e-mail), an instant message, word processing, keyboard emulation, an address book, a touch list, a widget, a Digital Right Management (DRM), voice recognition, voice replication, a position determining function, a location based service, etc. The extended memory 270 and internal memory 204 may include additional modules (i.e., instructions) besides the aforementioned module. Or, the extended memory 270 and internal memory 204 may not use some modules (i.e., instructions) according to need.

In accordance with various exemplary embodiments of the present invention, the application module may include instructions (referring to FIG. 8 or FIG. 9 below) for recognizing a user's grip state using a TSP sensor. Or, the application module may further include instructions (referring to FIG. 11 below) for displaying a soft keyboard array dependent on the user's grip state, or instructions (referring to FIG. 13 below) for performing volume adjustment dependent on the user's grip state, or instructions (referring to FIG. 16 below) for antenna selection dependent on a user's grip position.

Figure 3:
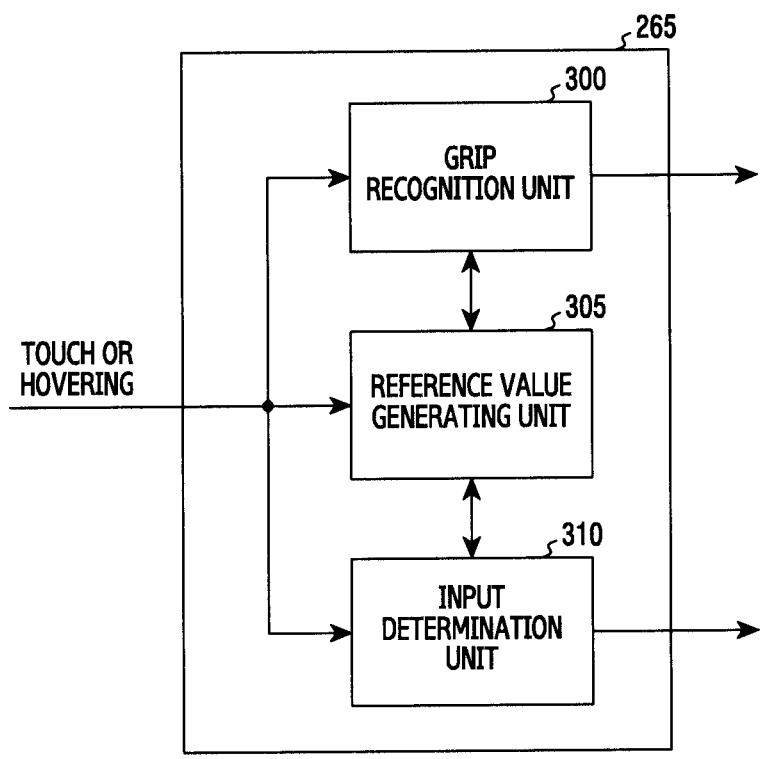
FIG. 3 is a diagram illustrating a detailed construction of a touch screen controller within an electronic device according to various exemplary embodiments of the present invention.

FIG. 3 is a diagram illustrating a detailed construction of a touch screen controller within an electronic device according to various exemplary embodiments of the present invention.

Referring to FIG. 3, the touch screen controller 265 may include a grip recognition unit 300, a reference value generation unit 305, and an input determination unit 310.

The touch screen controller 265 may receive a signal corresponding to a touch input or hovering input from the touch screen 260, and perform filtering (not shown) and eliminate a noise from the signal corresponding to the touch input or hovering input. The filtering may be implemented by one or more of a Low Pass Filter (LPF), a High Pass Filter (HPF), and a Band Pass Filter (BPF) in accordance with a noise characteristic.

The input determination unit 310 may process a filtered signal, analyze information of a position and width of a user touch or hovering input, and forward the information corresponding to the determined user input or hovering input to the processors 202 and 203.

The grip recognition unit 300 may analyze a distribution or pattern of a filtered output signal of a self-capacitive scheme or output signal of a mutual-capacitive scheme, determine a user's grip state, and forward the determination result to the processors 202 and 203.

To determine a grip situation, the reference value generation unit 305 may generate reference data for comparing with a newly inputted signal. The reference value is a value that each sensor of the touch panel has in case that there is no touch input or hovering input, that is, in case that the user hand grips nothing.

The reference value generation unit 305 may receive information about a current grip state from the grip recognition unit 300. If it is a grip state, the reference value generation unit 305 may not update the reference data. If it is a non-grip state, the reference value generation unit 305 may reflect newly inputted data and update the reference data. Here, the reference value generation unit 305 may update the reference data into weighted average or unweighted average of the existing reference data and the newly inputted data.

The grip recognition unit 300 may determine a user's grip state using signals (referring to FIGS. 6A to 6K or FIGS. 7A to 7C) corresponding to inputted TSP images. That is, the grip state may be determined by analyzing a pattern of an inputted 2D or 1D image. The grip recognition unit 300 may forward at least one of a non-grip state determination result or a left-hand/right-hand/both-hand grip state determination result to the processors 202 and 203.

Figure 4A:
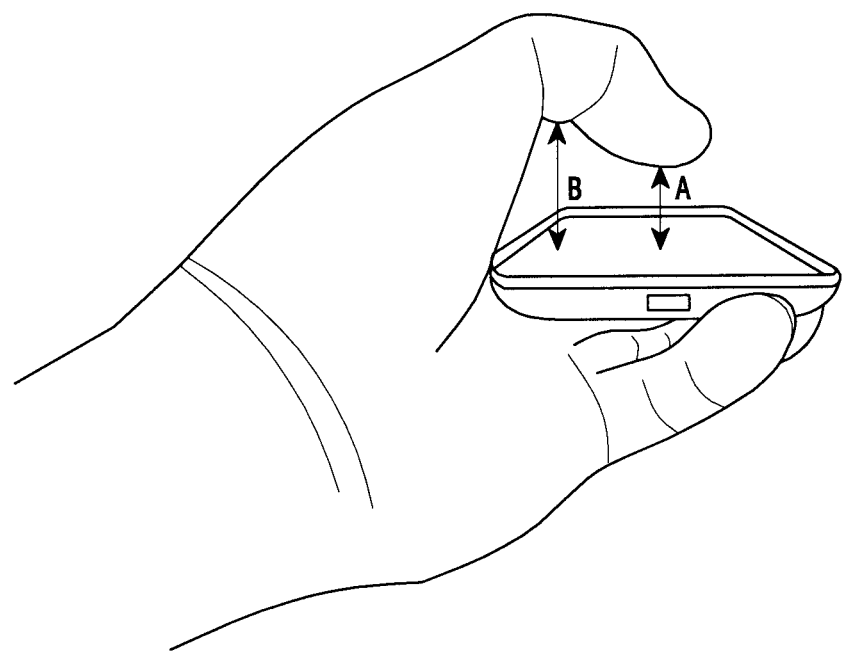
FIGS. 4A to 4C illustrate examples of a hovering input using a touch screen of an electronic device according to various exemplary embodiments of the present invention.
Figure 4B:
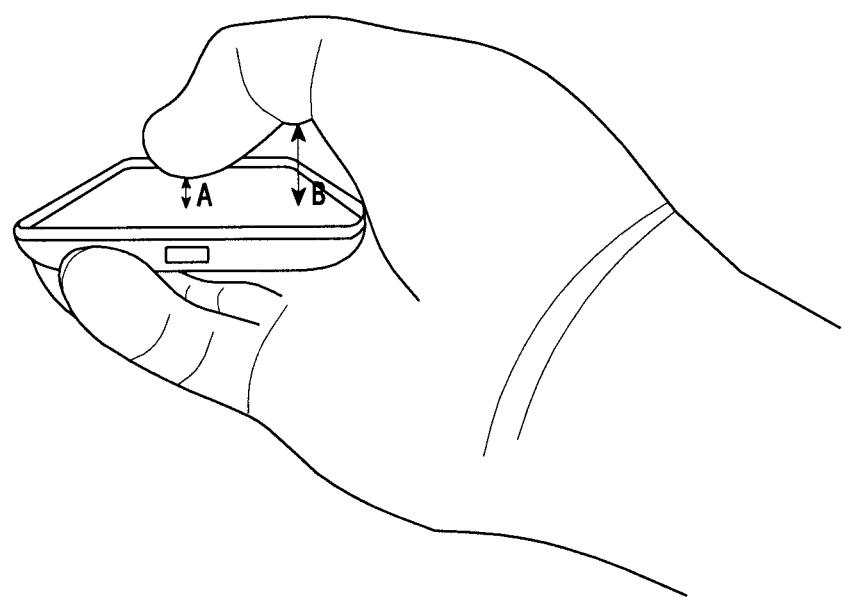
Figure 4C:
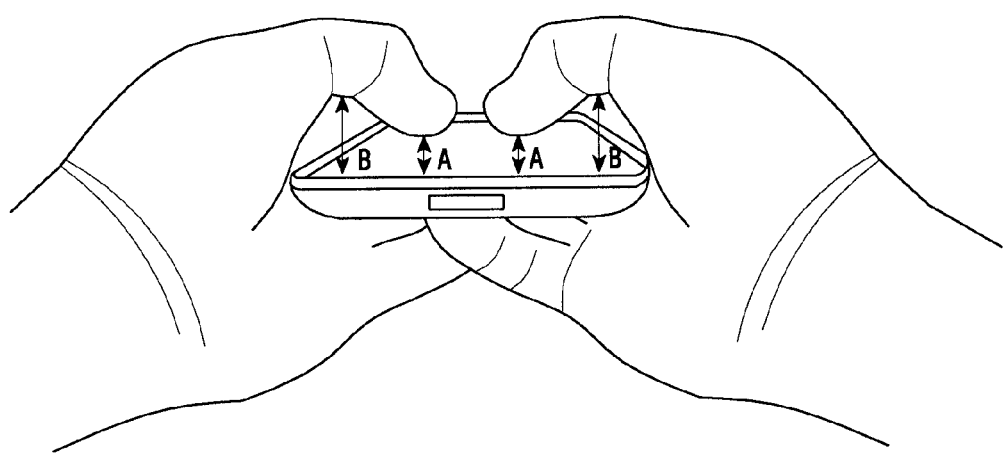

FIGS. 4A to 4C illustrate examples of a hovering input using a touch screen of an electronic device according to various exemplary embodiments of the present invention.

FIG. 4A is an example of a hovering input (or a proximity touch input) of a left-hand grip state, and FIG. 4B is an example of a hovering input of a right-hand grip state, and FIG. 4C is an example of a hovering input of a both-hand grip state.

Here, a distance between the touch screen and the thumb may be adjusted according to a sensitivity of the touch screen. When a user projects the thumb onto the touch screen, a distance between a point 'B' of the thumb and the touch screen may be different from a distance between a point 'A' of the thumb and the touch screen. In other words, when the user performs a hovering input with the thumb with gripping the electronic device with the hand, sensing degrees of sensors within a projection zone in which the thumb is projected onto the touch screen may be different from one another.

Figure 5A:
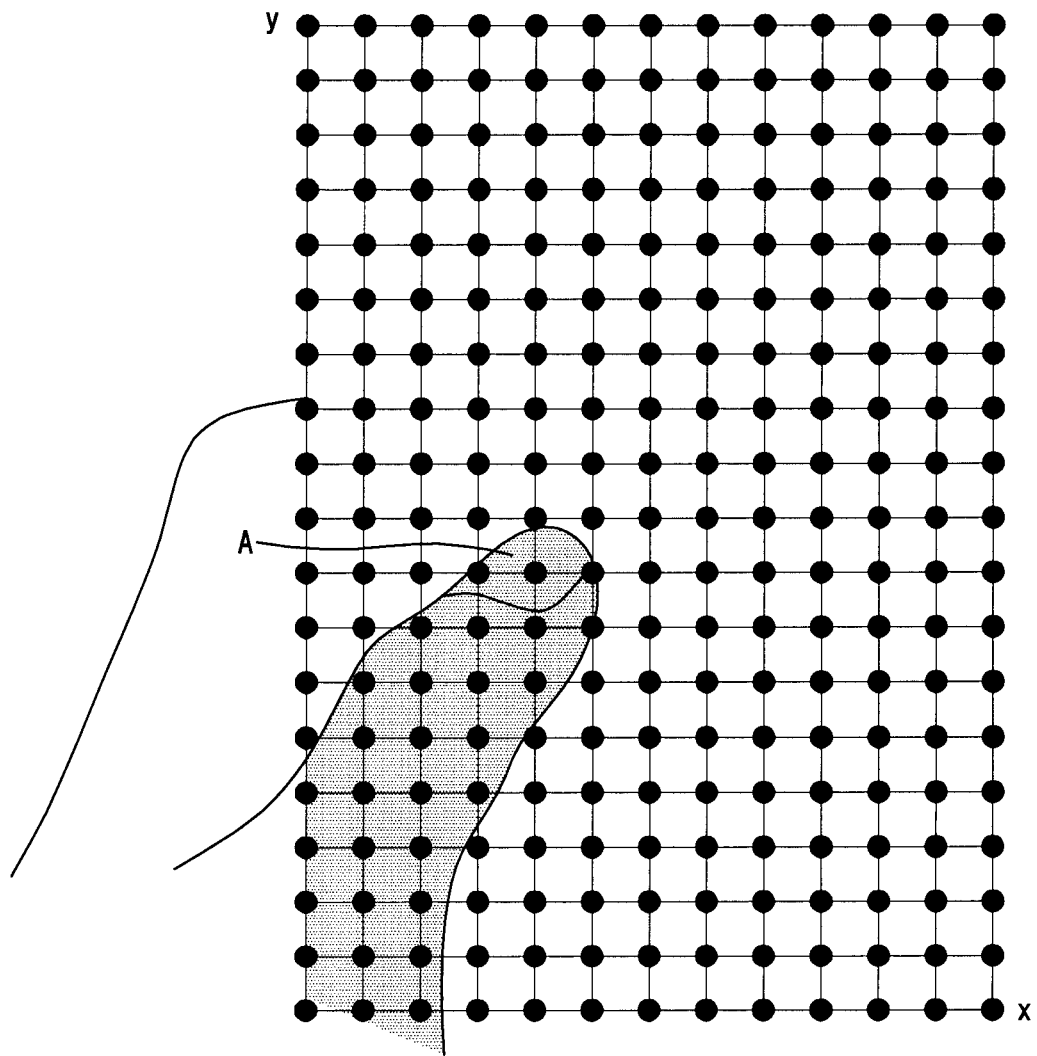
FIGS. 5A to 5C are example diagrams illustrating selecting Touch Screen Panel (TSP) sensors for recognition of a user's grip state according to various exemplary embodiments of the present invention.
Figure 5B:
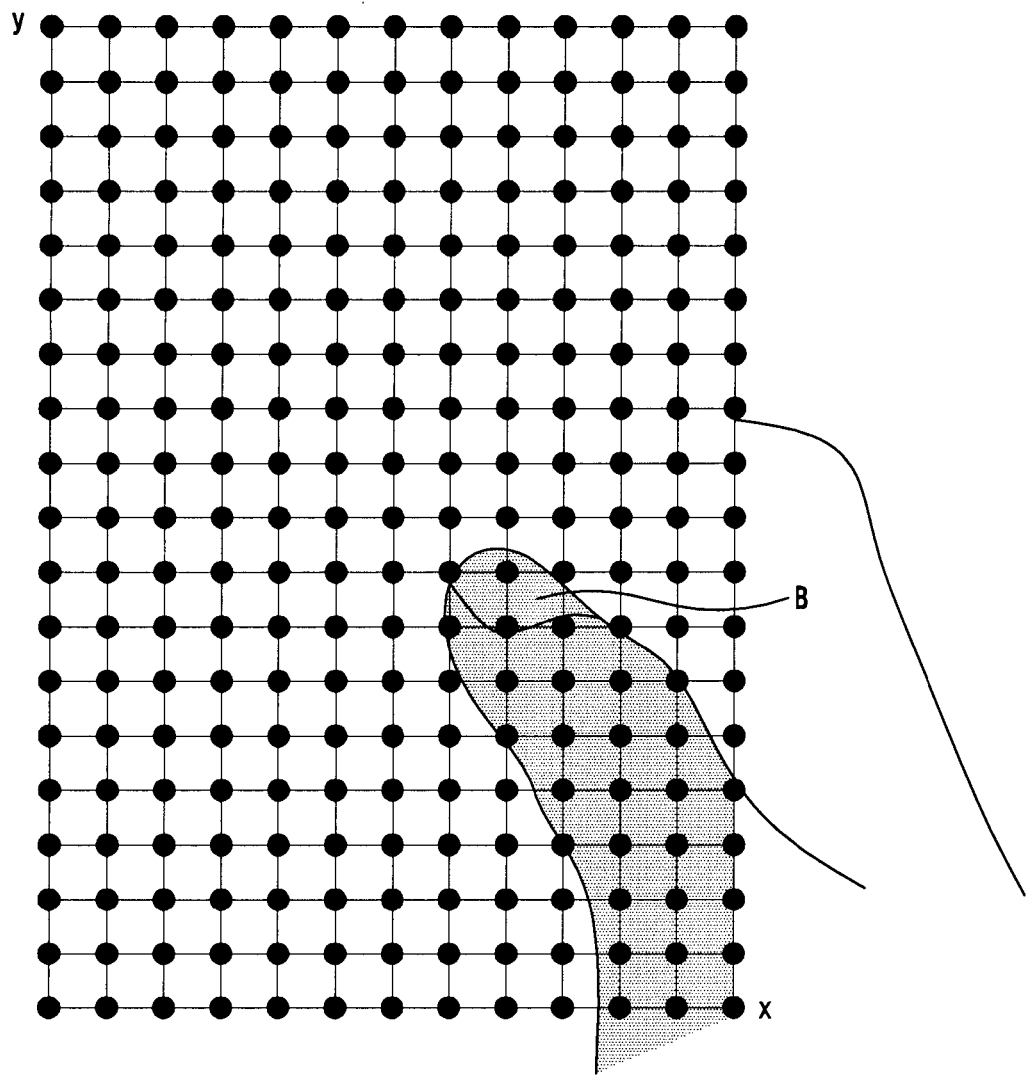
Figure 5C:
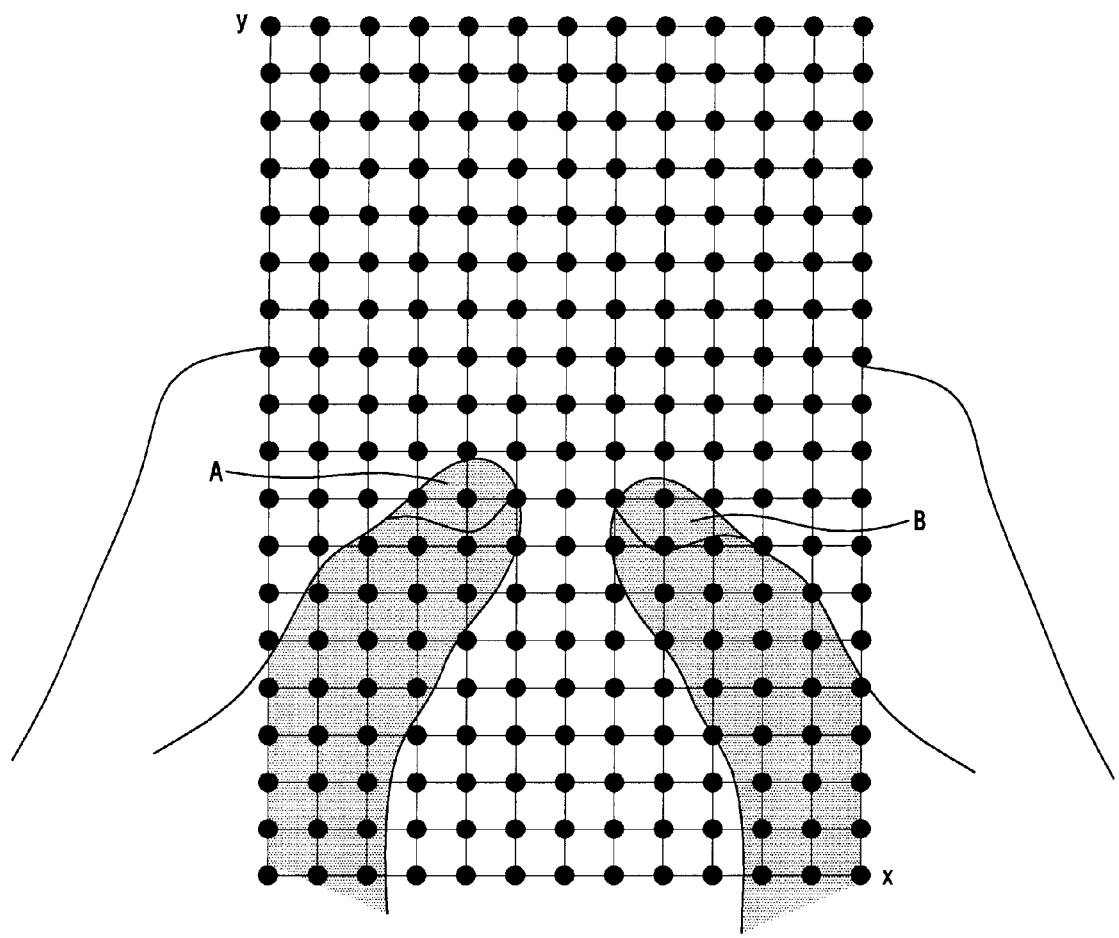

FIGS. 5A to 5C are example diagrams illustrating selecting TSP sensors for recognition of a user's grip state according to various exemplary embodiments of the present invention.

FIG. 5A illustrates a state in which the left-hand thumb is projected onto a touch screen at hovering input, and FIG. 5B illustrates a state in which the right-hand thumb is projected onto the touch screen at hovering input, and FIG. 5C illustrates a state in which the both-hand thumbs are projected onto the touch screen at hovering input.

A sensor may be arranged every intersection point of an X axis and a Y axis on the touch screen. At this time, as in FIG. 5A, if a user performs a hovering input with his/her left hand, sensors arranged in a zone 'A' in which the left-hand thumb is projected onto the touch screen may be affected by the hovering input, and generate output signals of a self-capacitive scheme or mutual-capacitive scheme and output the output signals to the touch screen controller 265, respectively. For instance, the output signals may be represented as in FIG. 6A, FIG. 6I or FIG. 7A in the touch screen controller 265. At this time, the output signals may be represented as a sum or average value of the output signals of the sensors in which a difference between the output signal of the sensor and a reference value of the sensor is equal to or is greater than a threshold every line on a basis of the X axis or Y axis. In various exemplary embodiments, the output signals may be represented as a sum or average value of the output signals of all the sensors of the line.

And, as in FIG. 5B, if the user performs a hovering input with his/her right hand, sensors arranged in a zone 'B' in which the right-hand thumb is projected onto the touch screen may be affected by the hovering input, and generate output signals of a self-capacitive scheme or mutual-capacitive scheme and output the output signals to the touch screen controller 265, respectively. The output signals may be represented as in FIG. 6B, FIG. 6J or FIG. 7B in the touch screen controller 265.

At this time, the output signals may be represented as a sum or average value of the output signals of the sensors in which a difference between the output signal of the sensor and the reference value of the sensor is equal to or is greater than the threshold every line on a basis of the X axis or Y axis. In various exemplary embodiments, the output signals may be represented as a sum or average value of the output signals of all the sensors of the line.

Likewise, as in FIG. 5C, if the user performs a hovering input with his/her both hands, sensors arranged in the zone 'A' in which the left-hand thumb is projected onto the touch screen and the zone 'B' in which the right-hand thumb is projected onto the touch screen may be affected by the hovering input, and generate output signals of a self-capacitive scheme or mutual-capacitive scheme and output the output signals to the touch screen controller 265, respectively. The output signals may be represented as in FIG. 6C, FIG. 6K or FIG. 7C in the touch screen controller 265.

At this time, the output signals may be represented as a sum or average value of the output signals of the sensors in which a difference between the output signal of the sensor and the reference value of the sensor is equal to or is greater than the threshold every line on a basis of the X axis or Y axis. In various exemplary embodiments, the output signals may be represented as a sum or average value of the output signals of all the sensors of the line.

FIGS. 6A to 6H illustrate in one dimension a distribution of output signals of a self-capacitive scheme outputted from TSP sensors for recognition of a user's grip state according to various exemplary embodiments of the present invention.

Figure 6A:
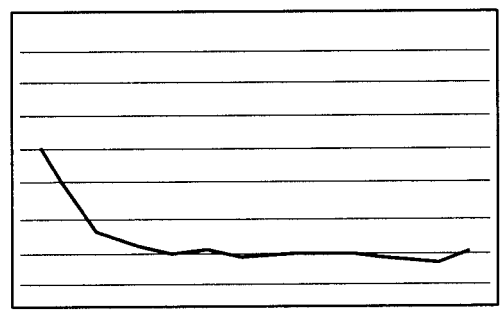
FIGS. 6A to 6H illustrate in one dimension a distribution of signals outputted from TSP sensors for recognition of a user's grip state according to various exemplary embodiments of the present invention.

FIG. 6A illustrates an output signal of a self-capacitive scheme in case that only an end portion of the thumb is used for a hovering input on a touch screen of an electronic device when a user grips the electronic device with his/her left hand. Sensors included in the left partial zone of an X axis may output signals, and sensors included in the right zone of the X axis may output no signal. So, high signals may be outputted in the left zone of the X axis, and low signals or no signal may be outputted in the right zone of the X axis.

Figure 6B:
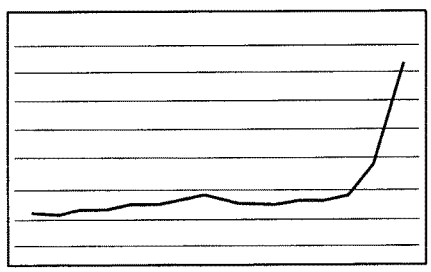

FIG. 6B illustrates an output signal of a self-capacitive scheme in case that only an end portion of the thumb is used for a hovering input on the touch screen of the electronic device when the user grips the electronic device with his/her right hand. Sensors included in the right partial zone of the X axis may output signals, and sensors included in the left zone of the X axis may output no signal. So, high signals may be outputted in the right zone of the X axis, and low signals or no signal may be outputted in the left zone of the X axis.

Figure 6C:
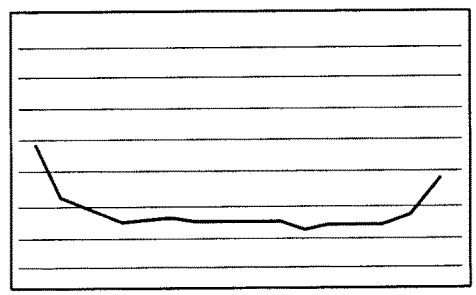

FIG. 6C illustrates an output signal of a self-capacitive scheme in case that only an end portion of the thumb is used for a hovering input on the touch screen of the electronic device when the user grips the electronic device with his/her both hands. Sensors included in the right partial zone and left partial zone of the X axis may output signals, and sensors included in a middle zone of the X axis may output no signal. So, high signals may be outputted in the right zone and left region of the X axis, and low signals or no signal may be outputted in the middle zone of the X axis.

Figure 6D:
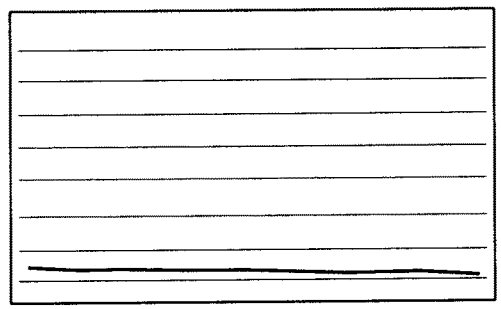

FIG. 6D illustrates an output signal when there is no hovering input, i.e., when an electronic device is not gripped with the user hand. Because there is no sensor operating by the hovering input, almost no output signal will be outputted.

Figure 6E:
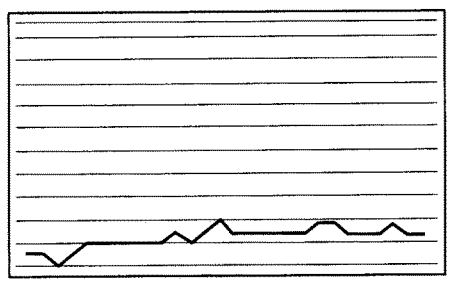
Figure 6F:
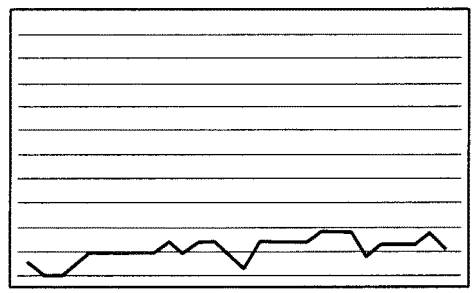
Figure 6G:
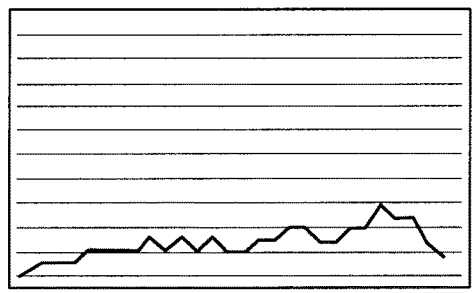
Figure 6H:
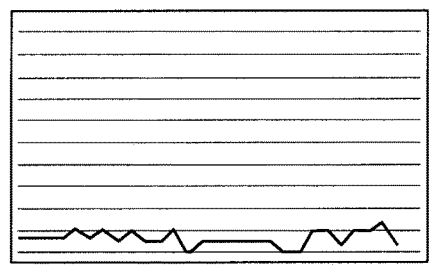

FIG. 6E illustrates an output signal on a basis of a Y axis in the same environment of FIG. 6A. And, FIG. 6F illustrates an output signal on a basis of the Y axis in the same environment of FIG. 6B. And, FIG. 6G illustrates an output signal on a basis of the Y axis in the same environment of FIG. 6C. And, FIG. 6H illustrates an output signal on a basis of the Y axis in the same environment of FIG. 6D.

As above, the electronic device may determine whether the user grips the electronic device with the left hand or right hand or both hands using a distribution or pattern of an output signal of the self-capacitive touch screen sensor. For instance, if a signal strength of the left edge of an X axis is equal to or is greater than a certain value, the electronic device may determine that it is a left-hand grip state. If a signal strength of the right edge of the X axis is equal to or is greater than a certain value, the electronic device may determine that it is a right-hand grip state. If the signal strength of the left edge of the X axis and the signal strength of the right edge of the X axis are equal to or are greater than the certain value, the electronic device may determine that it is a both-hand grip state.

To increase the accuracy of grip state recognition, the electronic device may correct the determination result using relationships between magnitudes of signals of other X-axis nodes and a magnitude of a signal of a neighboring node. In various exemplary embodiments of the present invention, when only some nodes, i.e., the thumb is projected onto the touch screen, the electronic device may sense and use signals of nodes included in a projection zone, but may use signals of all nodes as well.

Figure 6I:
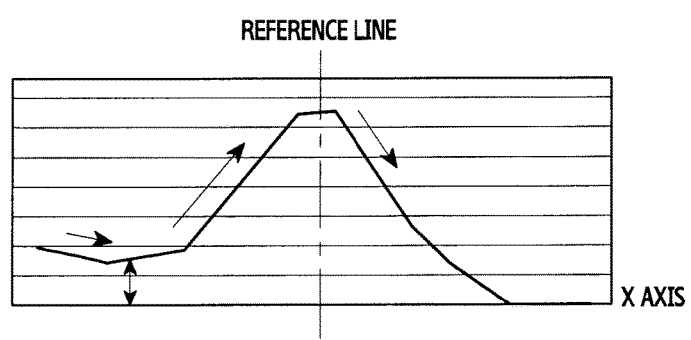
FIGS. 6I to 6K illustrate output signals of a self-capacitive touch screen sensor when the entire thumb and a partial palm is projected onto a touch screen according to various exemplary embodiments of the present invention.
Figure 6J:
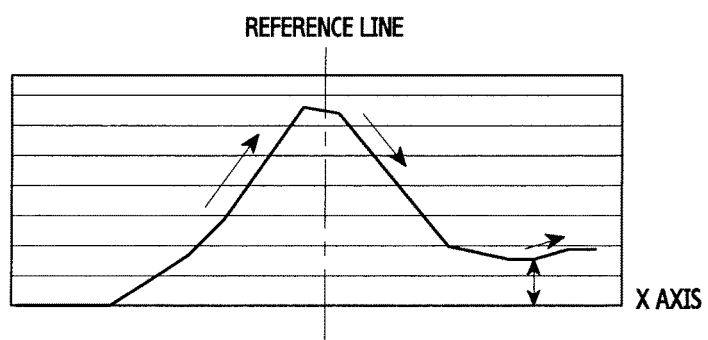
Figure 6K:
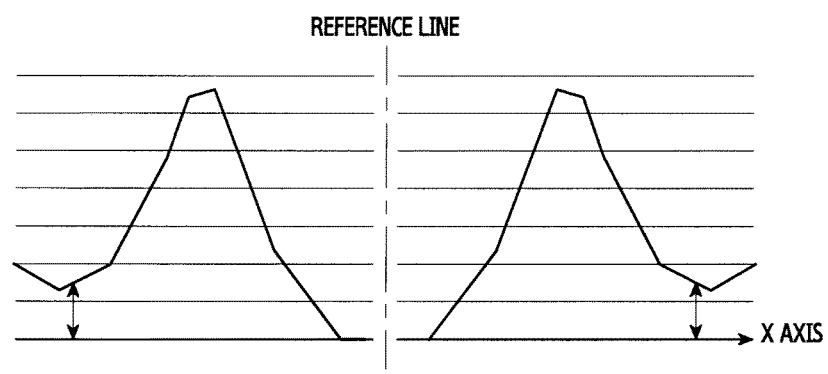

FIGS. 6I to 6K illustrate output signals of a self-capacitive touch screen sensor in case that the entire thumb and a partial palm are projected onto a touch screen according to various exemplary embodiments of the present invention.

FIG. 6I illustrates an output signal of the self-capacitive touch screen sensor in case that the entire thumb and a partial palm are used for a hovering input on a touch screen of an electronic device when a user grips the electronic device with the left hand. A thumb end portion and a partial palm may get in close proximity to the touch screen, and a region between the thumb and the partial palm may get in proximity to the touch screen farther than the thumb end portion or the partial palm. Accordingly, a signal of a certain level may be outputted at the left edge of an X axis, and the highest signal may be outputted at a reference line (i.e., a point at which the thumb end portion is projected onto the touch screen) of the X axis, and almost no signal may be outputted at the right edge of the X axis.

FIG. 6J illustrates an output signal of the self-capacitive touch screen sensor in case that the entire thumb and a partial palm are used for a hovering input on the touch screen of the electronic device when the user grips the electronic device with the right hand. A thumb end portion and a partial palm may get in close proximity to the touch screen, and the region between the thumb and the partial palm may get in proximity to the touch screen farther than the thumb end portion or the partial palm. Accordingly, a signal of a certain level may be outputted at the right edge of the X axis, and the highest signal may be outputted at a reference line (i.e., a point at which the thumb end portion is projected onto the touch screen) of the X axis, and almost no signal may be outputted at the left edge of the X axis.

FIG. 6K illustrates an output signal of the self-capacitive touch screen sensor in case that both entire thumbs and both partial palms are used for a hovering input on the touch screen of the electronic device when the user grips the electronic device with both hands. Both thumb end portions and both partial palms may get in close proximity to the touch screen, and the regions between the thumbs and the partial palms may get in proximity to the touch screen farther than the both thumb end portions or both partial palms. Accordingly, signals of certain levels may be outputted at the left edge and right edge of the X axis, and the highest signals may be outputted at both reference lines (i.e., points at which the both thumb end portions are projected onto the touch screen) of the X axis and almost no signal may be outputted at a middle region of the X axis.

In another exemplary embodiment of the present invention, at left-hand gripping motion, as in FIG. 6I, a data distribution of an X axis is shown in a form of decreasing-increasing-decreasing in the direction of the X axis. At right-hand gripping motion, as in FIG. 6J, a data distribution of the X axis is shown in a form of increasing-decreasing-increasing in the direction of the X axis. This form may be a feature capable of distinguishing the left-hand gripping and the right-hand gripping.

Figure 7A:
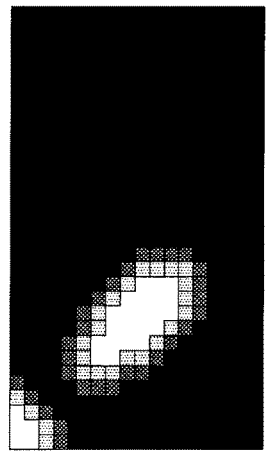
FIGS. 7A to 7C illustrate in two dimensions a distribution of signals outputted from TSP sensors for recognition of a user's grip state according to various exemplary embodiments of the present invention.
Figure 7B:
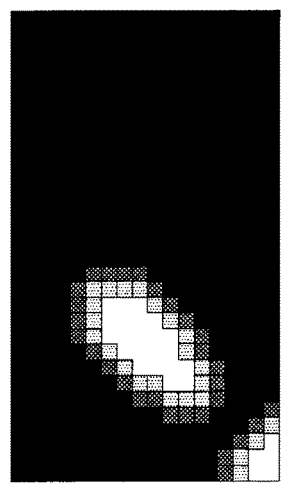
Figure 7C:
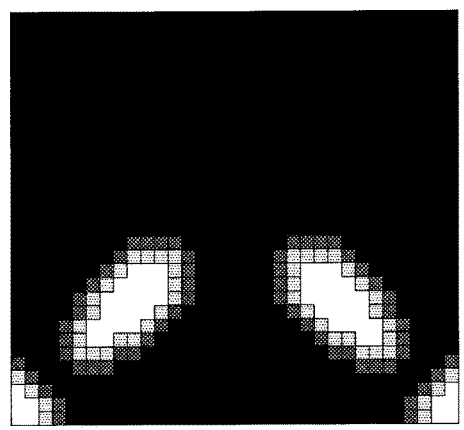

FIGS. 7A to 7C illustrate in two dimensions a distribution of output signals of a mutual-capacitive scheme outputted from TSP sensors for recognition of a user's grip state according to various exemplary embodiments of the present invention.

FIG. 7A illustrates a two-dimension pattern of an output signal of a mutual-capacitive scheme when it is a left-hand grip state, and FIG. 7B illustrates a two-dimension pattern of an output signal of a mutual-capacitive scheme when it is a right-hand grip state, and FIG. 7C illustrates a two-dimension pattern of an output signal of a mutual-capacitive scheme when it is a both-hand grip state.

As shown in FIG. 7A to FIG. 7C, if a signal of a specific shape, specific magnitude and specific strength is sensed at the left or right and lower end of a two-dimension image, the electronic device may determine that it is a left-hand handling mode or a right-hand handling mode. If the signal is sensed concurrently at the left and lower end and right and lower end of the 2D image, the electronic device may determine that it is a both-hand handling mode, and if no signal is sensed, the electronic device may determine that it is a both hand handling mode.

In other various exemplary embodiments, there is a method using mechanical learning. The method may divide a user's grip state into a non-grip state, a left-hand grip state, a right-hand grip state, and a both-hand grip state, and distinguish and store signals (i.e., 2D or 1D signals) corresponding to hovering inputs of the user's grip states, and deduce a coefficient of a corresponding signal node on the basis of the mechanical learning, and output the defined state for a newly inputted signal on the basis of the deduced coefficient.

Figure 8:
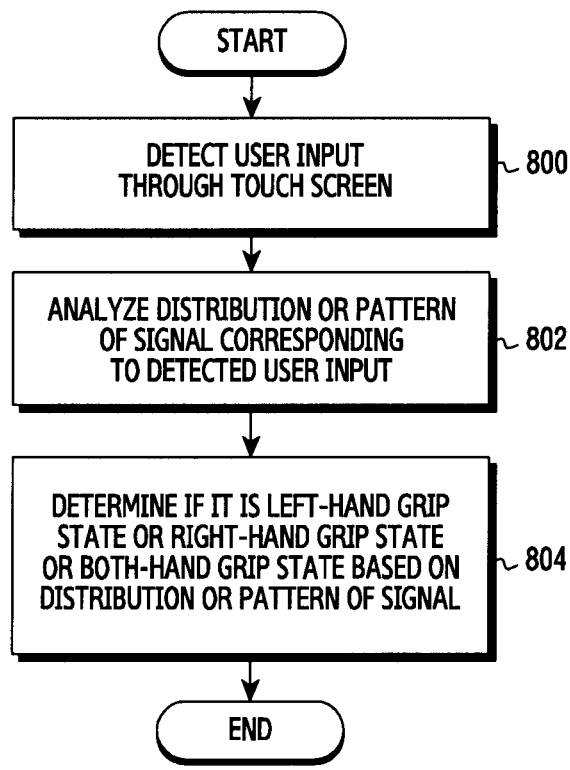
FIG. 8 is a flowchart for recognizing a user's grip state according to various exemplary embodiments of the present invention.

FIG. 8 is a flowchart for recognizing a user's grip state according to various exemplary embodiments of the present invention.

Referring to FIG. 8, in step 800, an electronic device may detect a user input through a touch screen. For example, the electronic device may detect an input of any one of FIG. 4A, FIG. 4B, FIG. 4C, or a non-grip state.

Thereafter, in step 802, the electronic device may analyze a distribution and pattern of a signal corresponding to the detected user input, based on a self-capacitive scheme or mutual-capacitive scheme. In step 804, the electronic device may determine if it is a left-hand grip state or a right-hand grip state or a both-hand grip state, based on the distribution or pattern of the signal.

For instance, as in FIG. 6A, FIG. 6B, and FIG. 6C, in case that a pattern of a signal based on a self-capacitive scheme is shown, if a signal strength of the left edge of an X axis is equal to or is greater than a certain value, the electronic device may determine that it is the left-hand grip state. If a signal strength of the right edge of the X axis is equal to or is greater than a certain value, the electronic device may determine that it is a right-hand grip state. If the signal strength of the left edge of the X axis and the signal strength of the right edge of the X axis are equal to or are greater than a certain value, the electronic device may determine that it is a both-hand grip state.

In other various exemplary embodiments, as in FIGS. 6I to 6K, in case that a pattern of a signal of an X axis based on a self-capacitive scheme is shown, if the pattern is of a form of decreasing-increasing-decreasing in the direction of the X axis, the electronic device may determine that it is a left-hand grip state and, if the pattern is of a form of increasing-decreasing-increasing in the direction of the X axis, the electronic device may determine that it is a right-hand grip state.

In other various exemplary embodiments, as shown in FIG. 7A to FIG. 7C, if a signal of a specific shape, specific magnitude and specific strength based on a mutual-capacitive scheme is sensed at the left or right and lower end of a two-dimension image, the electronic device may determine that it is a left-hand handling mode or a right-hand handling mode. If the signal is sensed concurrently at the left and lower end and right and lower end of the 2D image, the electronic device may determine that it is a both-hand handling mode, and if no signal is sensed, the electronic device may determine that it is a both hand handling mode.

Figure 9:
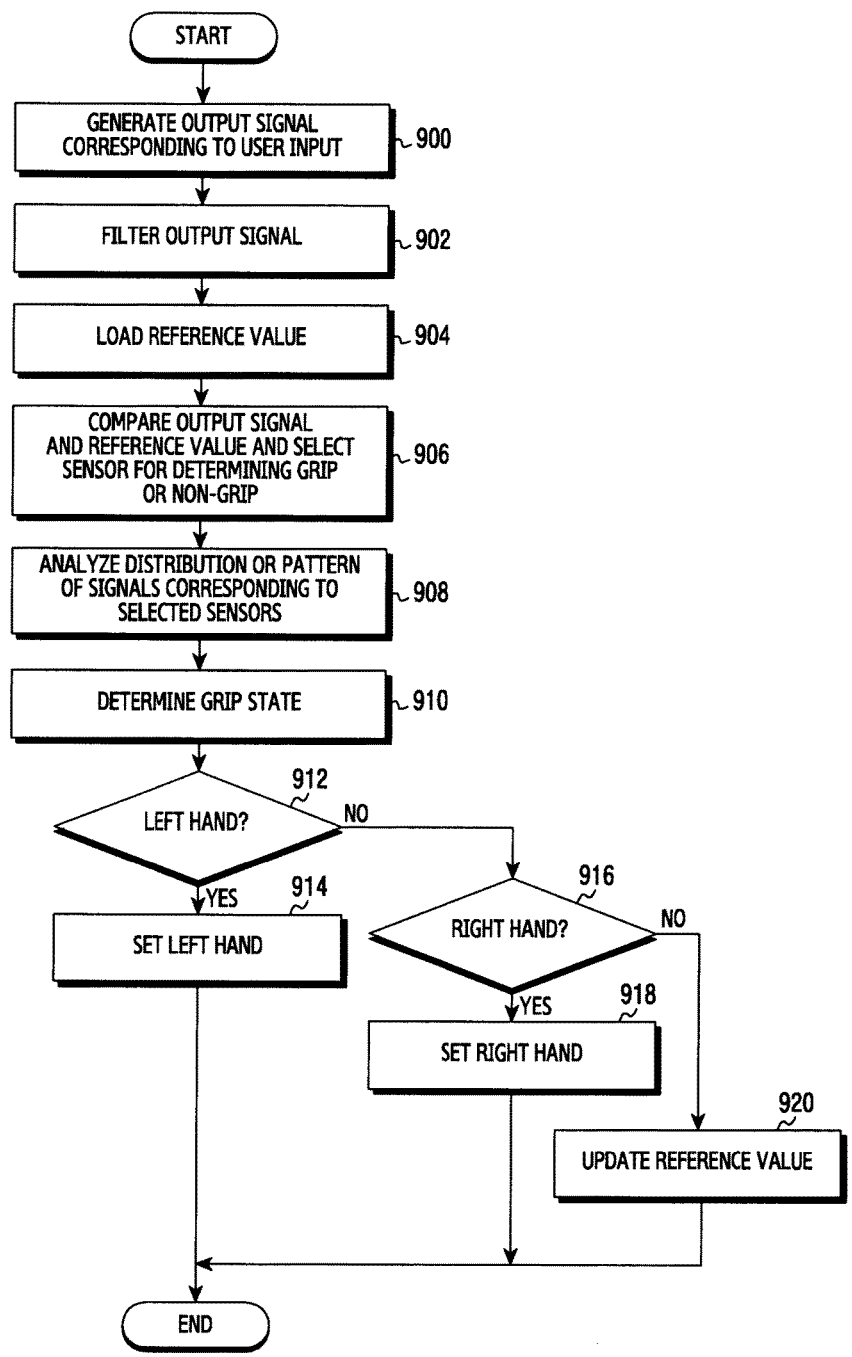
FIG. 9 is a flowchart for recognizing a user's grip state according to various exemplary embodiments of the present invention.

FIG. 9 is a flowchart for recognizing a user's grip state according to various exemplary embodiments of the present invention.

Referring to FIG. 9, in step 900, an electronic device may generate an output signal corresponding to a user input based on a self-capacitive scheme or a mutual-capacitive scheme. In step 902, the electronic device may filter the output signal to eliminate a noise.

After that, in step 904, the electronic device may load a reference value. In step 906, the electronic device may compare the output signal and the reference value and select a sensor for determining grip or non-grip. Here, the reference value refers to a value corresponding to an output signal of a non-grip state in accordance with a sensor characteristic.

Next, in step 908, the electronic device may analyze a distribution or pattern of the output signals corresponding to the selected sensors. In step 910, the electronic device may determine if it is a left-hand grip state or a right-hand grip state or a both-hand grip state based on the distribution or pattern of the output signals.

If it is determined that it is the left-hand grip state in step 912, the electronic device may proceed to step 914 and control a UI or UX suitable to left-hand setting.

If it is determined that it is the right-hand grip state in step 916, the electronic device may proceed to step 918 and control a UI or UX suitable to right-hand setting.

If it is determined that it is the both-hand grip state in step 917, the electronic device may proceed to step 919 and control a UI or UX suitable to both-hand setting.

If it is not determined that it is the left-hand grip state, the right-hand grip state or the both-hand grip state, in step 920, the electronic device may update the reference value. For example, the electronic device may update the reference value by averaging the reference value and a current output signal value or substituting the reference value with the current output signal value.

FIGS. 10A to 10C illustrate examples of displaying a soft keyboard array dependent on a user's grip state according to various exemplary embodiments of the present invention.

FIG. 10A illustrates an example of displaying an input keyboard slanting to the left in consideration of left-hand input when sensing that it is a left-hand grip state during Internet searching in an electronic device, and FIG. 10B illustrates an example of displaying the input keyboard slanting to the right in consideration of right-hand input when sensing that it is a right-hand grip state during the Internet searching in the electronic device.

FIG. 10C illustrates an example of displaying an input keyboard suitably to a horizontal size ratio in consideration of both-hand input when sensing that it is a both-hand grip state during the Internet searching in the electronic device.

Figure 11:
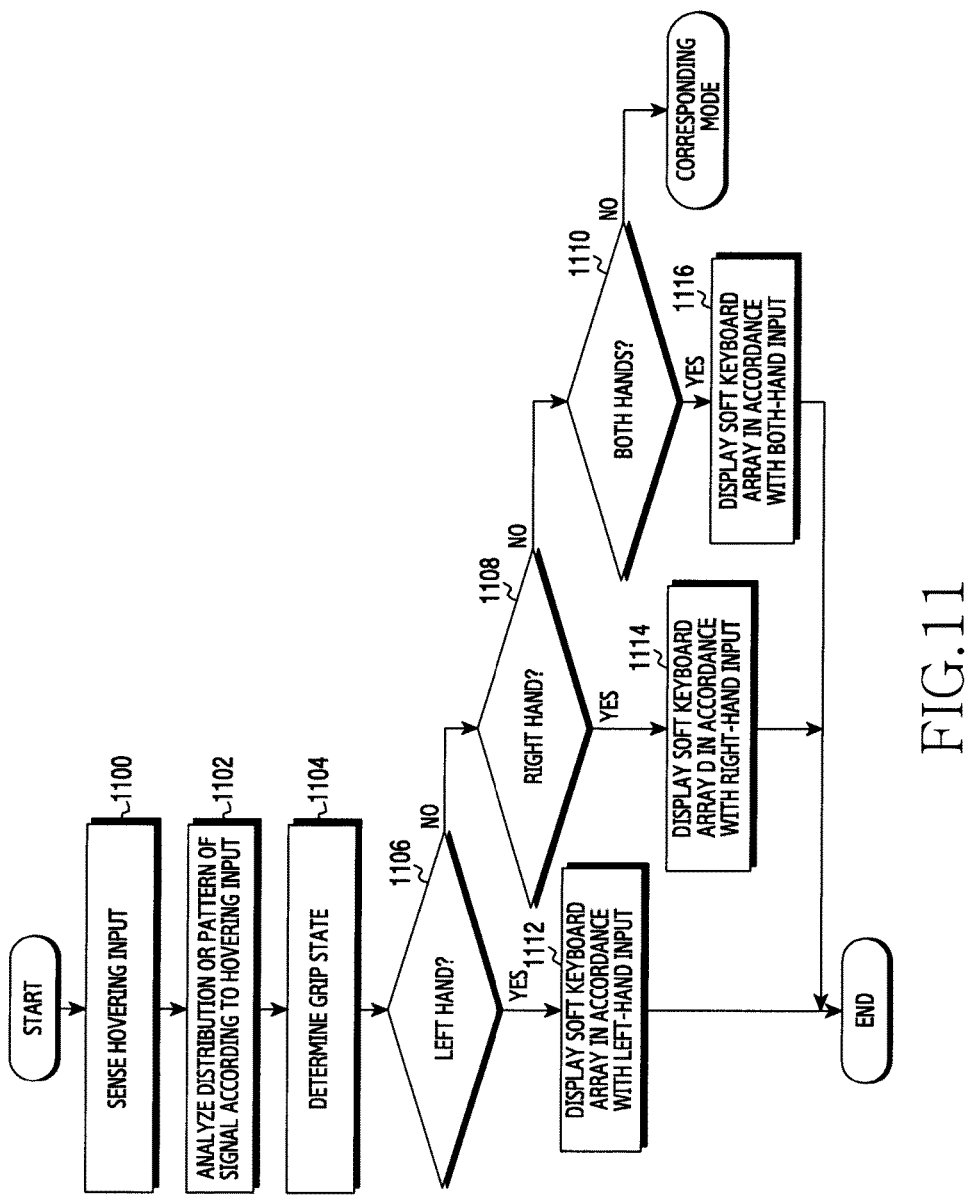
FIG. 11 is a flowchart illustrating displaying a soft keyboard array dependent on a user's grip state according to various exemplary embodiments of the present invention.

FIG. 11 is a flowchart illustrating displaying a soft keyboard array dependent on a user's grip state according to various exemplary embodiments of the present invention.

Referring to FIG. 11, in step 1100, an electronic device may sense a hovering input based on a self-capacitive scheme or a mutual-capacitive scheme. For example, the electronic device may sense an input of any one of FIG. 4A, FIG. 4B, FIG. 4C or a non-grip state.

After that, in step 1102, the electronic device may analyze a distribution or pattern of an output signal corresponding to the hovering input. For example, the electronic device may analyze a distribution or pattern of an output signal displayed on a basis of an X axis or Y axis in a one-dimension space as in FIG. 6A to 6K, or a distribution or pattern of an output signal displayed in a two-dimension space as in FIGS. 7A to 7C.

Next, in step 1104, the electronic device may determine if it is a left-hand grip state or a right-hand grip state or a both-hand grip state based on the distribution or pattern of the output signal corresponding to the hovering input. For instance, as in FIG. 6A, FIG. 6B, and FIG. 6C, in case that a signal pattern is shown, if a signal strength of the left edge of an X axis is equal to or is greater than a certain value, the electronic device may determine that it is the left-hand grip state. If a signal strength of the right edge of the X axis is equal to or is greater than a certain value, the electronic device may determine that it is the right-hand grip state. If the signal strength of the left edge of the X axis and the signal strength of the right edge of the X axis are equal to or are greater than a certain value, the electronic device may determine that it is the both-hand grip state.

In other various exemplary embodiments, as in FIGS. 6I to 6K, in case that a pattern of data of an X axis is shown, if the pattern is of a form of decreasing-increasing-decreasing in the direction of the X axis, the electronic device may determine that it is the left-hand grip state and, if the pattern is of a form of increasing-decreasing-increasing in the direction of the X axis, the electronic device may determine that it is the right-hand grip state. In other various exemplary embodiments, as shown in FIG. 7A to FIG. 7C, if a signal of a specific shape, specific magnitude and specific strength is sensed at the left or right and lower end of a two-dimension image, the electronic device may determine that it is a left-hand handling mode or a right-hand handling mode. If the signal is sensed concurrently at the left and lower end and right and lower end of the 2D image, the electronic device may determine that it is a both-hand handling mode, and if no signal is sensed, the electronic device may determine that it is a both hand handling mode.

After that, if it is determined that it is the left-hand grip state in step 1106, the electronic device may proceed to step 1112 and display a soft keyboard array or a virtual keyboard array in consideration of a user's left-hand input as in FIG. 10A. If it is determined that it is the right-hand grip state in step 1108, the electronic device may proceed to step 1114 and display a soft keyboard array or a virtual keyboard array in consideration of a user's right-hand input as in FIG. 10B. If it is determined that it is the both-hand grip state in step 1110, the electronic device may proceed to step 1116 and display a soft keyboard array or a virtual keyboard array in consideration of a user's both-hand input as in FIG. 10C.

In contrast, if it is not determined that it is the left-hand grip state, the right-hand grip state or the both-hand grip state, the electronic device may proceed to a corresponding mode. For example, the electronic device may display a soft keyboard array or a virtual keyboard array as a default as in FIG. 10C.

FIGS. 12A and 12B illustrate examples of volume adjustment dependent on a user's grip state according to various exemplary embodiments of the present invention.

FIG. 12A is an example of adjusting a volume using preset hearing information of the right ear of a user in accordance with a right-hand grip state, and FIG. 12B illustrates an example of adjusting the volume using preset hearing information of the left ear of the user in accordance with a left-hand grip state. For example, as the hearing is weaker, a high volume may be set and, as the hearing is stronger, a low volume may be set. In FIGS. 12A and 12B, the user may make a phone call with gripping an electronic device with the right hand and holding the electronic device to the right ear, and the user may make a phone call with gripping the electronic device with the left hand and holding the electronic device to the left ear.

Figure 13:
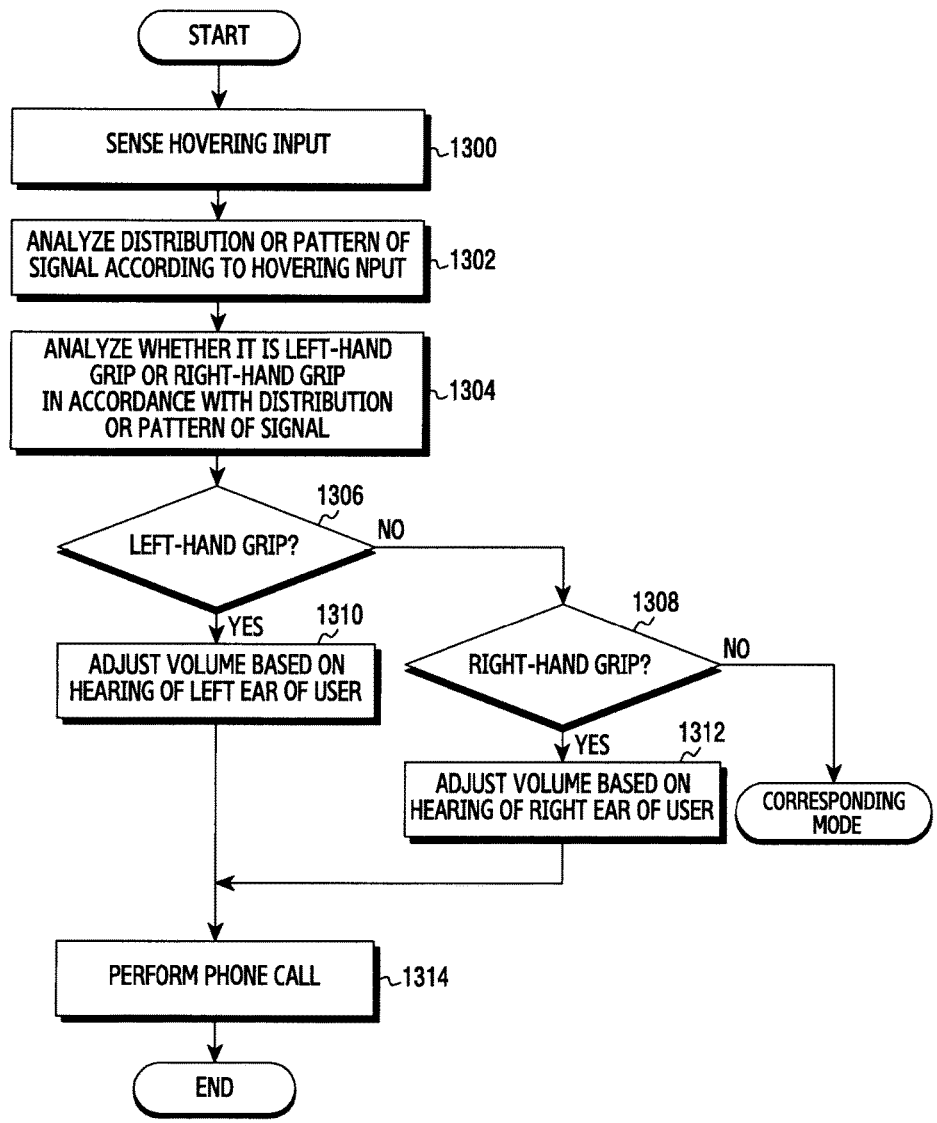
FIG. 13 is a flowchart illustrating performing volume adjustment dependent on a user's grip state according to various exemplary embodiments of the present invention.

FIG. 13 is a flowchart illustrating performing volume adjustment dependent on a user's grip state according to various exemplary embodiments of the present invention.

Referring to FIG. 13, in step 1300, an electronic device may sense a hovering input during a call setup. For example, the electronic device may sense an input of any one of FIG. 4A, FIG. 4B, FIG. 4C, or a non-grip state.

After that, in step 1302, the electronic device may analyze a distribution or pattern of an output signal corresponding to the hovering input based on a self-capacitive scheme or a mutual-capacitive scheme. For example, For example, the electronic device may analyze a distribution or pattern of an output signal displayed on a basis of an X axis or Y axis in a one-dimension space as in FIG. 6A to 6K, or a distribution or pattern of an output signal displayed in a two-dimension space as in FIGS. 7A to 7C.

Next, in step 1304, the electronic device may determine whether it is a left-hand grip state or a right-hand grip state based on the distribution or pattern of the output signal corresponding to the hovering input. For instance, as in FIG. 6A, FIG. 6B, and FIG. 6C, in case that a signal pattern is shown, if a signal strength of the left edge of an X axis is equal to or is greater than a certain value, the electronic device may determine that it is the left-hand grip state. If a signal strength of the right edge of the X axis is equal to or is greater than a certain value, the electronic device may determine that it is the right-hand grip state. If the signal strength of the left edge of the X axis and the signal strength of the right edge of the X axis are equal to or are greater than a certain value, the electronic device may determine that it is the both-hand grip state.

In other various exemplary embodiments, as in FIGS. 6I to 6K, in case that a pattern of data of an X axis is shown, if the pattern is of a form of decreasing-increasing-decreasing in the direction of the X axis, the electronic device may determine that it is the left-hand grip state and, if the pattern is of a form of increasing-decreasing-increasing in the direction of the X axis, the electronic device may determine that it is the right-hand grip state. In other various exemplary embodiments, as shown in FIG. 7A to FIG. 7C, if a signal of a specific shape, specific magnitude and specific strength is sensed at the left or right and lower end of a two-dimension image, the electronic device may determine that it is a left-hand handling mode or a right-hand handling mode. If the signal is sensed concurrently at the left and lower end and right and lower end of the 2D image, the electronic device may determine that it is a both-hand handling mode.

Thereafter, if it is determined that it is the left-hand grip state in step 1306, the electronic device may proceed to step 1310 and adjust a volume based on a hearing of the left ear of a user as in FIG. 12B. If it is determined that it is a right-hand grip state in step 1308, the electronic device may proceed to step 1312 and adjust a volume based on a hearing of the right ear of the user as in FIG. 12A.

In contrast, if it is not determined that it is the left-hand or right-hand grip state, the electronic device may enter a corresponding mode. For example, the electronic device may adjust the volume to a default volume or maintain a preset volume.

Next, in step 1314, the electronic device may make a phone call at the set volume.

The aforementioned description has been made for an example of determining if it is a left-hand grip state, a right-hand grip state or a both-hand grip state by using a distribution or pattern of an output signal of a self-capacitive scheme shown centering on an X axis or Y axis in a one-dimension space as in FIG. 6A to 6K or sensing an output signal of a mutual-capacitive scheme of a specific shape, specific magnitude, and specific strength shown at a left or right and lower end in a two-dimension space as in FIGS. 7A to 7C. Additionally, the electronic device may also determine a grip position using the distribution or pattern of the output signal corresponding to the hovering input. For example, the electronic device may determine if a portion gripped by a user is the left and upper side, the left and lower side, the right and upper side, or the right and lower side.

FIGS. 14A to 14H illustrate distributions or patterns of signals dependent on user's grip positions based on a self-capacitive scheme according to various exemplary embodiments of the present invention.

Figure 14A:
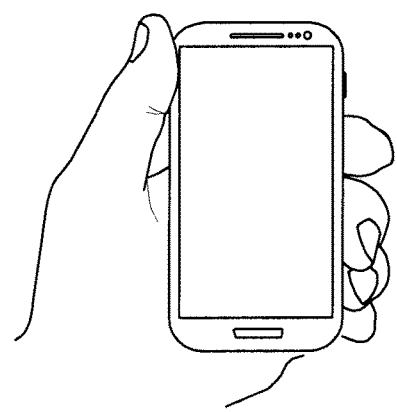
FIGS. 14A to 14H illustrate signal distributions or patterns dependent on user's grip positions according to various exemplary embodiments of the present invention.
Figure 14B:
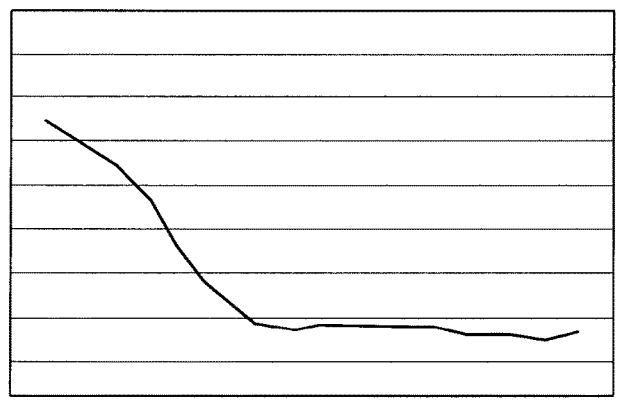

FIG. 14A is an example diagram in which a user grips an electronic device equipped with left and right antennas with the left hand, and FIG. 14B is a waveform of a signal of an X axis in a left-hand grip state.

Figure 14C:
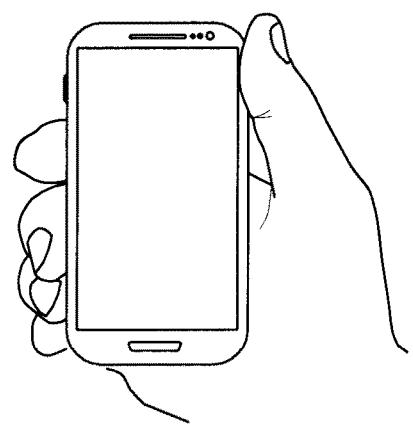
Figure 14D:
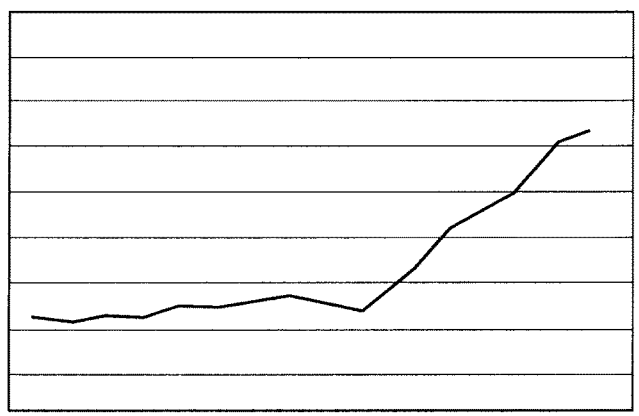

FIG. 14C is an example diagram in which the user grips an electronic device equipped with left and right antennas with the right hand, and FIG. 14D is a waveform of a signal of the X axis in a right-hand grip state.

Figure 14E:
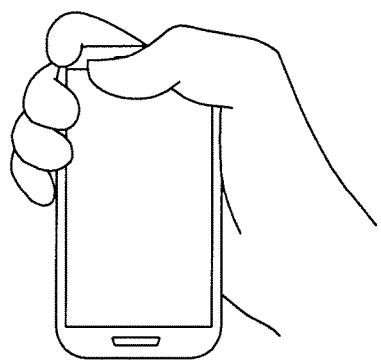
Figure 14F:
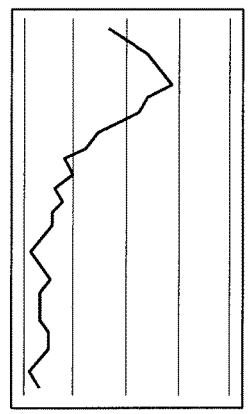

FIG. 14E is an example diagram in which the user grips an upper end part of an electronic device equipped with upper and lower antennas, and FIG. 14F is a waveform of a signal of a Y axis in a state of gripping the upper end part of the electronic device.

Figure 14G:
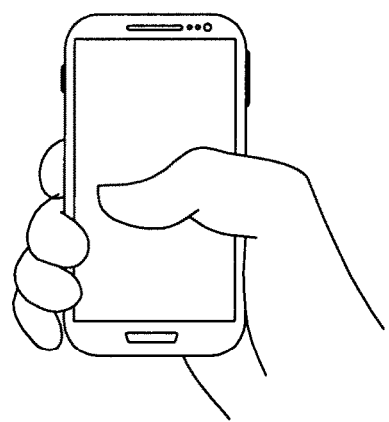
Figure 14H:
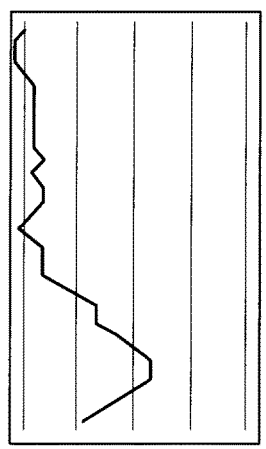

FIG. 14G is an example diagram in which the user grips a lower end part of an electronic device equipped with upper and lower antennas, and FIG. 14H is a waveform of a signal of the Y axis in a state of gripping the lower end part of the electronic device.

FIGS. 15A and 15B illustrate examples of antenna selection dependent on user's grip positions according to various exemplary embodiments of the present invention.

Referring to FIGS. 15A to 15B, an electronic device installing right and left antennas may set to select the right second antenna when sensing an output signal of a waveform of FIG. 14B and select the left first antenna when sensing an output signal of a waveform of FIG. 14D, thereby keeping data communication.

Though not illustrated, the electronic device installing the upper first and lower 20 second antennas may set to select the lower second antenna when sensing an output signal of a waveform of FIG. 14F, and select the upper first antenna when sensing an output signal of a waveform of FIG. 14H, thereby maintaining data communication.

As above, the electronic device may select an antenna in consideration of a user's grip state, thereby minimizing signal attenuation caused by user's hand, and decreasing power consumption caused by communication with a base station.

In FIGS. 15A and 15B, the description has been made for a case of the electronic device installing the right and left antennas or a case of the electronic device installing the upper and lower antennas, but it is obvious that the present invention is applicable even to an electronic device installing more antennas. For instance, in case that the electronic device is equipped with upper, lower, left and right antennas, the electronic device may also select one of the upper, lower, left and right antennas using waveforms of output signals corresponding to the upper, lower, left and right.

Figure 16:
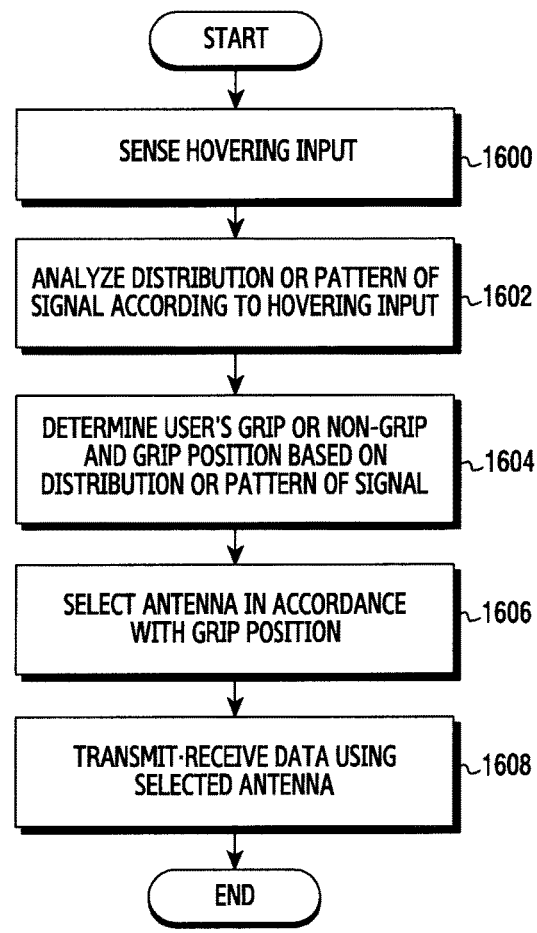
FIG. 16 is a flowchart illustrating antenna selection dependent on a user's grip position according to various exemplary embodiments of the present invention.

FIG. 16 is a flowchart illustrating antenna selection dependent on a user's grip position according to various exemplary embodiments of the present invention.

Referring to FIG. 16, in step 1600, the electronic device may sense a hovering input during data communication. For example, the electronic device may sense an input of any one of FIG. 14A, FIG. 14C, FIG. 14E, FIG. 14G or a non-grip state.

Thereafter, in step 1602, the electronic device may analyze a distribution or pattern of an output signal corresponding to the hovering input based on a self-capacitive scheme or a mutual-capacitive scheme. For example, the electronic device may acquire a signal waveform of FIG. 14B, FIG. 14D, FIG. 14F or FIG. 14H.

Next, in step 1604, the electronic device may determine grip or non-grip and a grip position based on the distribution or pattern of the output signal corresponding to the hovering input. For instance, the electronic device may determine if the grip position is the left and lower end, the left and upper end, the right and upper end, or the right and lower end.

Thereafter, in step 1606, the electronic device may select an antenna for performing data communication in accordance with the grip position. For instance, if it is determined that the grip position is the left and lower end, the electronic device may select the remnant antenna excepting an antenna of the left and lower end. If it is determined that the grip position is the left and upper end, the electronic device may select the remnant antenna excepting an antenna of the left and upper end. If it is determined that the grip position is the right and lower end, the electronic device may select the remnant antenna excepting an antenna of the right and lower end. If it is determined that the grip position is the right and upper end, the electronic device may select the remnant antenna excepting an antenna of the right and upper end.

Next, in step 1608, the electronic device may perform data transmission/reception using the selected antenna.

In FIG. 1 to FIG. 16, the description has been, for example, made for a case of determining a user hand's grip state or grip position in a display activation state but, in various exemplary embodiments, even in a display inactivation state, the electronic device may sense a hovering input, and analyze a distribution, pattern or waveform of an output signal corresponding to the hovering input, and determine the user hand's grip state or grip position.

As described above, exemplary embodiments of the present invention may provide a convenient UX or UI to a user by checking a user's grip and handling state. For this, the conventional art requires an additional sensor capable of determining user's grip or non-grip, but various exemplary embodiments of the present invention may provide a method for determining a user's grip and handling state using an existing TSP sensor used for touch recognition without installing an additional grip sensor, thereby preventing a cost incurred by the installing of the additional sensor and providing the same function to users at a low cost.

Methods according to exemplary embodiments stated in claims and/or specification of the present invention may be implemented in a form of hardware, software, or a combination of hardware and software.

If the methods are implemented by the software, a computer-readable storage medium storing one or more programs (i.e., software modules) may be provided. The one or more programs stored in the computer-readable storage medium are configured to be executed by one or more processors within an electronic device. The one or more programs may include instructions for enabling the electronic device to execute the methods according to the exemplary embodiments stated in the claims and/or specification of the present invention.

These programs (i.e., software modules or software) may be stored in a Random Access Memory (RAM), a nonvolatile memory including a flash memory, a Read Only Memory (ROM), an Electrically Erasable Programmable ROM (EEPROM), a magnetic disk storage device, a Compact Disk ROM (CD-ROM), a Digital Versatile Disk (DVD) or an optical storage device of other form, and a magnetic cassette. Or, the programs may be stored in a memory constructed by a combination of some or all of them. Also, each constructed memory may be included in plural.

Also, the programs may be stored in an attachable storage device accessible to the electronic device through a communication network such as the Internet, an intranet, a Local Area Network (LAN), a Wireless LAN (WLAN) and a Storage Area Network (SAN) or a communication network constructed by a combination of them. This storage device may connect to the electronic device through an external port.

Also, a separate storage device on the communication network may connect to a portable electronic device.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for recognizing a user's grip state in an electronic device, the method comprising:
    detecting a hovering input which is inputted by a user's grip on the electronic device through a capacitive touch screen of the electronic device; and
    determining, based on the hovering input, the user's grip state,
    wherein determining the user's grip state comprises:
        determining that the user's grip state is a left-hand grip state in response to identifying that a distribution of a signal corresponding to the hovering input includes a first form of decreasing-increasing-decreasing from a left edge of the capacitive touch screen to a right edge of the capacitive touch screen according to one axis of the capacitive touch screen, wherein a first difference between the signal and a reference value is greater than a threshold level during the decreasing-increasing of the first form, and the first difference is a zero level at the right edge; and
        determining that the user's grip state is a right-hand grip state in response to identifying that the distribution includes a second form of increasing-decreasing-increasing from the left edge to the right edge according to the one axis, wherein a second difference between the signal and the reference value is greater than the threshold level during the decreasing-increasing of the second form, and the second difference is the zero level at the left edge.

2. The method of claim 1, wherein determining the user's grip state further comprises in response to identifying that the distribution includes a third form of decreasing-increasing-decreasing-increasing-decreasing-increasing from the left edge to the right edge according to the one axis, determining that the user's grip state is a both-hand grip state, wherein a third difference between the signal and the reference value is greater than the threshold level during the decreasing-increasing-decreasing-increasing-decreasing-increasing of the third form.

3. The method of claim 1, further comprising:
  determining a user's grip position based on the determined user's grip state;
  selecting at least one antenna in consideration of the user's grip position; and
  transmitting/receiving data using the selected at least one antenna.

4. The method of claim 3, wherein selecting the at least one antenna in consideration of the user's grip position comprises selecting a remnant antenna excepting an antenna corresponding to the user's grip position.

5. The method of claim 1, further comprising:
  adjusting a call volume in accordance with the user's grip state.

6. The method of claim 5, wherein adjusting the call volume in accordance with the user's grip state further comprises:
  in response to determining that the user's grip state is the left-hand grip state, adjusting the call volume in consideration of a left hearing of a user, and
  in response to determining that the user's grip state is the right-hand grip state, adjusting the call volume in consideration of a right hearing of the user.

7. An apparatus for recognizing a user's grip state in an electronic device, the apparatus comprising:
  a capacitive touch screen; and
  a touch screen controller controlling the capacitive touch screen,
  wherein the touch screen controller is configured to:
  detect a hovering input which is inputted by a user's grip on the electronic device through the capacitive touch screen; and
  determine, based on the hovering input, the user's grip state,
  wherein the touch screen controller is further configured to:
    determine that the user's grip state is a left-hand grip state in response to identifying that a distribution of a signal corresponding to the hovering input includes a first form of decreasing-increasing-decreasing from a left edge of the capacitive touch screen to a right edge of the capacitive touch screen according to one axis of the capacitive touch screen, wherein a first difference between the signal and a reference value is greater than a threshold level during the decreasing-increasing of the first form, and the first difference is a zero level at the right edge; and
    determine that the user's grip state is a right-hand grip state in response to identifying that the distribution includes a second form of increasing-decreasing-increasing from the left edge to the right edge according to the one axis, wherein a second difference between the signal and the reference value is greater than the threshold level during the decreasing-increasing of the second form, and the second difference is the zero level at the left edge.

8. The apparatus of claim 7, wherein the touch screen controller is further configured to:
  in response to identifying that the distribution includes a third form of decreasing-increasing-decreasing-increasing-decreasing-increasing from the left edge to the right edge according to the one axis, determine that the user's grip state is a both-hand grip state, wherein a third difference between the signal and the reference value is greater than the threshold level during the decreasing-increasing-decreasing-increasing-decreasing-increasing of the third form.

9. The apparatus of claim 7, wherein the touch screen controller is further configured to determine the user's grip state using a method of mechanical learning based on a pattern of previously extracted data.

10. The apparatus of claim 7, wherein the touch screen controller is further configured to:
  determine a user's grip position based on the determined user's grip state;
  select at least one antenna in consideration of the user's grip position; and
  transmit/receive data using the selected at least one antenna.

11. The apparatus of claim 10, wherein the touch screen controller is further configured to select a remnant antenna excepting an antenna corresponding to the user's grip position.

12. The apparatus of claim 7, wherein the touch screen controller is further configured to adjust a call volume in accordance with the user's grip state.

13. The apparatus of claim 12, wherein the touch screen controller is further configured to:
  in response to determining that the user's grip state is the left-hand grip state, adjust a call volume in consideration of a left hearing of a user, and
  in response to determining that the user's grip state is the right-hand grip state, adjust the call volume in consideration of a right hearing of the user.

14. A non-transitory computer-readable storage medium for storing one or more programs, performed by an electronic device, the one or more programs including instructions which allow the device to perform a method for recognizing a user's grip state in the electronic device, the method comprising:
  detecting a hovering input which is inputted by a user's grip on the electronic device through a capacitive touch screen of the electronic device; and
  determining, based on the hovering input, the user's grip state,
  wherein determining the user's grip state comprises:
    determining that the user's grip state is a left-hand grip state in response to identifying that a distribution of a signal corresponding to the hovering input includes a form of decreasing-increasing-decreasing from a left edge of the capacitive touch screen to a right edge of the capacitive touch screen according to one axis of the capacitive touch screen, wherein a first difference between the signal and a reference value is greater than a threshold level during the decreasing-increasing of a first form, and the first difference is a zero level at the right edge; and
    determining that the user's grip state is a right-hand grip state in response to identifying that the distribution includes a form of increasing-decreasing-increasing from the left edge to the right edge according to the one axis, wherein a second difference between the signal and the reference value is greater than the threshold level during the decreasing-increasing of a second form, and the second difference is the zero level at the left edge.

* * * * *